(12) United States Patent
Nagata et al.

(10) Patent No.: US 6,643,449 B1
(45) Date of Patent: Nov. 4, 2003

(54) RECORDING/REPRODUCING APPARATUS, VIDEO DATA RECORDING APPARATUS, RECORDING METHOD, REPRODUCING METHOD

(75) Inventors: Hiroyuki Nagata, Kanagawa-ken (JP); Noriya Sakamoto, Kanagawa-ken (JP); Masahiro Yamada, Kanagawa-ken (JP); Michihiro Fukushima, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/384,376

(22) Filed: Aug. 27, 1999

(30) Foreign Application Priority Data

Nov. 10, 1998 (JP) .............................. 10-319287
Mar. 29, 1999 (JP) .............................. 11-085985
Aug. 4, 1999 (JP) .............................. 11-221362

(51) Int. Cl.⁷ .............................. H04N 5/91; H04N 7/00; H04N 5/781
(52) U.S. Cl. .............................. 386/46; 386/68; 386/125
(58) Field of Search .............................. 386/46, 125, 126, 386/124, 109, 111, 112, 68, 69, 70, 79, 80, 82, 81, 95, 105, 106, 45, 1, 27, 33, 6; H04N 5/91, 7/00, 5/85

(56) References Cited

U.S. PATENT DOCUMENTS 5,739,971 A * 4/1998 Yamaki et al.
5,953,300 A * 9/1999 Serizawa et al.

FOREIGN PATENT DOCUMENTS

JP  6-276485  9/1994

* cited by examiner

Primary Examiner—Robert Chevalier
(74) Attorney, Agent, or Firm—Pillsbury Winthrop LLP

(57) ABSTRACT

A demultiplexing/GOP head detecting section detects a PCR value, while a recording/reproduction control section records a video or audio packet in a bit stream file and records information on the number of packets every PCR value and GOP. In reproduction, a reproduction position corresponding to a shift time is judged on the basis of information on the number of packets at every PCR value and GOP. This improves the shifting and returning speeds to time shift reproduction.

16 Claims, 29 Drawing Sheets

"DISPLAY OF 10 MINUTES BEFORE"

"DISPLAY MADE 5 MINUTES BEFORE THROUGH
DISPLAY TO BE MADE 3 MINUTES LATER
ARE POSSIBLE"

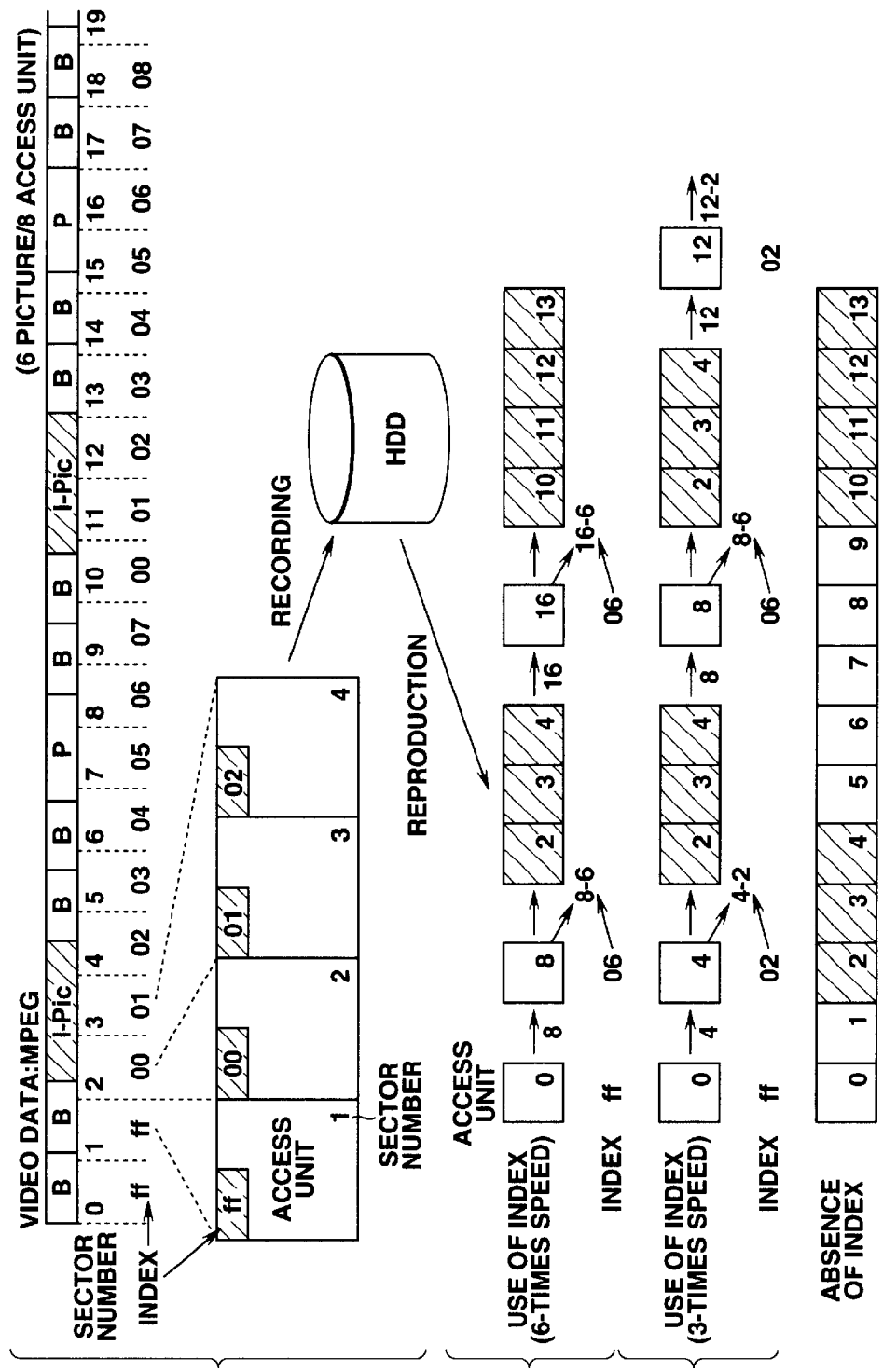

INDEX : CLUSTER UNIT (SECTOR UNIT) (CLUSTER ADDRESS + BYTE ADDRESS)

INDEX : CLUSTER UNIT (CLUSTER ADDRESS + SECTOR ADDRESS)

INDEX : CLUSTER UNIT

INDEX : SECTOR UNIT

RECORDING/REPRODUCING APPARATUS, VIDEO DATA RECORDING APPARATUS, RECORDING METHOD, REPRODUCING METHOD

BACKGROUND OF THE INVENTION

1. Field of the Invention

The present invention relates to a recording/reproducing apparatus, a video data recording apparatus, a recording method and a reproducing method, capable of receiving digital broadcast for its recording/reproduction.

2. Description of the Related Art

In recent years, digital broadcast, conducting transmission and reception in a digital mode, has taken place, and tape devices such as D-VHS (Digital Tape Recorder) has been developed as apparatus for recording a digital broadcast signal in the form of a bit stream.

FIG. 1 is a block diagram showing a technique related to such a recording/reproducing apparatus.

A digital broadcast signal is inputted to an input terminal 1. The digital broadcasting employs the MPEG2 system. This MPEG2 is designed to send transmission data in units of packets in order to facilitate time division multiplexing of pluralities of images, voices, data and others. One packet is composed of the same type of data, and an identification signal representative of the type of data is added to each packet. According to the MPEG standard, a signal is made to be transmitted through the use of a transport stream (TS) in which a 188-byte length transport packet (TS packet) is taken as a unit of transmission.

Furthermore, each stream, such as video (image) data and audio (voice) data, is sent by an elementary stream (ES). A header is added to the ES to constitute a PES (Packetized Elementary Stream) packet. Since the PES packet is relatively large in volume, its transmission is made with a payload of a plurality of transport packets. Incidentally, a detailed description of the PES appears in ISO/IEC13818-3.

This transport stream comes in the input terminal 1. In recording, the transport stream inputted to the input terminal 1 is supplied to a tape recording device 6 to be recorded on a bit stream recording tape 7.

The transport stream inputted to the input terminal 1 is also given to a selecting circuit 2. This selecting circuit 2 selects the transport stream from the input terminal 1 or the transport stream reproduced from the tape recording device 6 and outputs the selected transport stream to a TS depacket processing section 3.

A demultiplex processing section 4 of the TS depacket processing section 3 demultiplexes the inputted transport stream to separately supply different types of packets on the same program to a PES producing section 5. The PES producing section 5 provides a video PES packet and an audio PES packet by the payload of a plurality of TS packets. These video and audio PES data are forwarded to a video decoder 8 and an audio decoder 9, respectively.

The video decoder 8 decodes video PES data to produce a video signal, while the voice decoder 9 decodes audio PES data to create an audio signal. These video and audio signals are outputted through terminals 10 and 11, respectively.

In this way, in the example of FIG. 1, the inputted transport stream is recorded directly. Thus, the record medium requires a relatively large recording capacity; consequently, a tape medium is generally used as the record medium. However, the use of the tape medium needs a long time for tape supply in the case of jumping reproducing positions and, for example, a problem occurs in that difficulty is experienced in conducting time shift reproduction.

As described above, in the related technique to a recording/reproducing apparatus, when a large-capacity tape medium is employed as a record medium in consideration of a recording capacity, there is a problem in needing a long time for the tape supply in the time shift reproduction or the like.

SUMMARY OF THE INVENTION

Accordingly, it is an object of the present invention to provide a recording/reproducing apparatus, a video data recording apparatus, a recording method and a reproducing method, capable of access suitable for a disk medium.

Another object of this invention is to provide a recording/reproducing apparatus, a video data recording apparatus, a recording method and a reproducing method, capable of setting an accurate shift time in time shift reproduction through the use of a disk medium.

A further object of this invention is to provide a recording/reproducing apparatus, a video data recording apparatus, a recording method and a reproducing method, capable of improving the access in the time shift reproduction and the return speed for the ordinary reproduction.

A still further object of this invention is to a recording/reproducing apparatus, a video data recording apparatus, a recording method and a reproducing method, capable of gaining access to specific video data with high efficiency at N-times speed reproduction of a disk retaining compressed and encoded video data.

In accordance with this invention, there is provided a recording and reproducing apparatus comprising reproduction unit detecting means for receiving a compressed and encoded signal to detect a head of a reproduction unit of this signal, recording and reproducing means for recording the compressed and encoded signal on a predetermined record medium and further for reproducing the recorded signal, management information recording means for recording time information corresponding to the reproduction unit head and information on a signal quantity of the reproduction unit, and reproduction control means for making a decision on a reproduction position of the predetermined record medium in reproduction on the basis of the time information and the signal quantity information recorded by the management information recording means.

Furthermore, according to this invention, there is provided a video data recording apparatus which records video data on a disk in a state where the video data is divided in access units of the disk, comprising recording means for conducting the recording in a state where an index for access to an access unit where specific video data is recorded is added to each of the access units.

Still furthermore, according to this invention, there is provided a video data recording method of recording video data on a disk in a state where the video data is divided into access units of the disk, comprising a step of conducting the recording in a state where an index for access to an access unit, where specific video data is recorded, is given to each of the access units.

Moreover, according to this invention, there is provided a video data reproducing method which reproduces video data at an N-times speed from a disk on which the video data is recorded in a state of being divided into access units and an index for access to the access unit where a specific video data exists is recorded in each of the access units, comprising the steps of reading out the index from the disk every predetermined number of access units set on the basis of a multiplier by which the reproduction speed increases accordingly, whenever the index is read out, detecting a recorded position of the access unit where the specific video data exists in accordance with the read index, and reading out recorded data from the access unit at the detected position.

The other features and advantages of the present invention will become more readily apparent from the following description.

BRIEF DESCRIPTION OF THE DRAWINGS

FIGS. 28A to 28D are illustrations for describing a still further embodiment of this invention;

DESCRIPTION OF THE PREFERRED EMBODIMENTS

Figure 1:
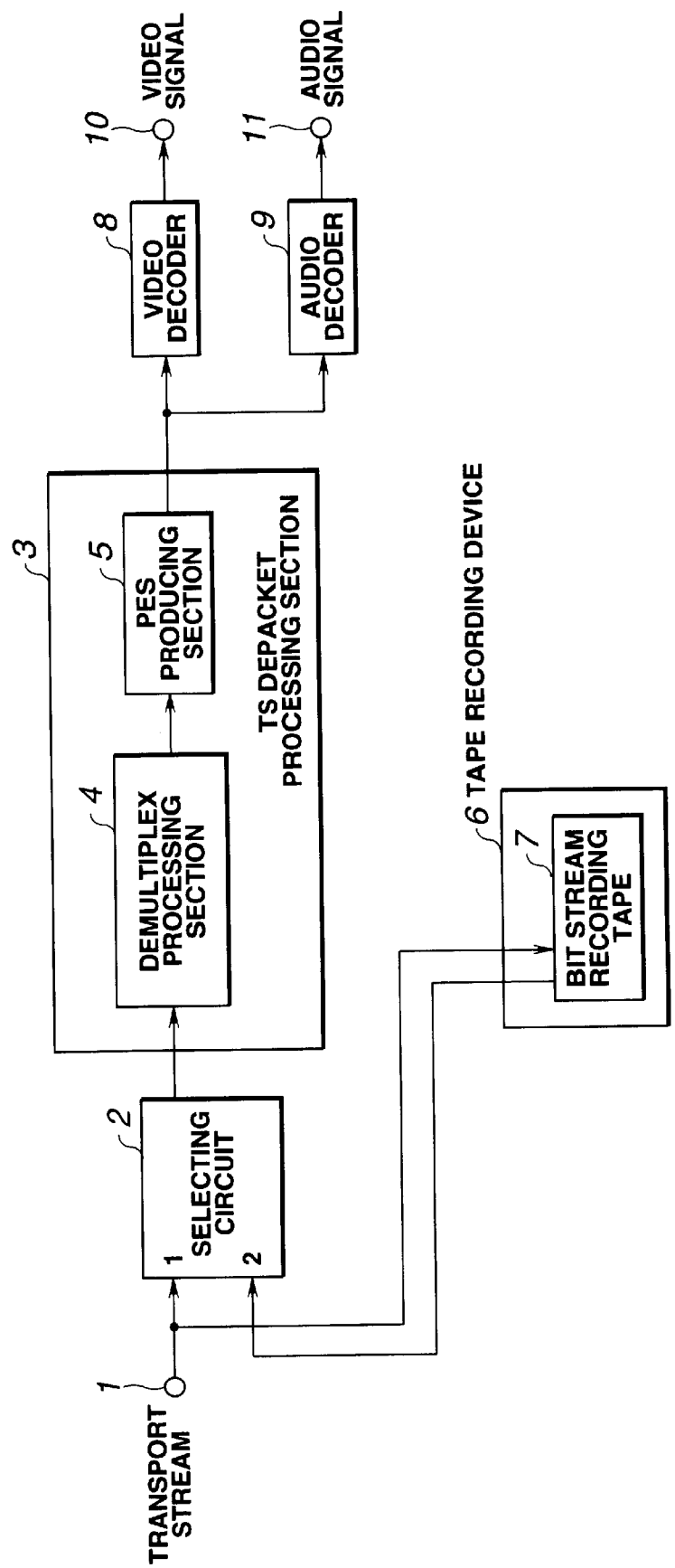
FIG. 1 is a block diagram showing a technique related to a recording/reproducing apparatus.
Figure 2:
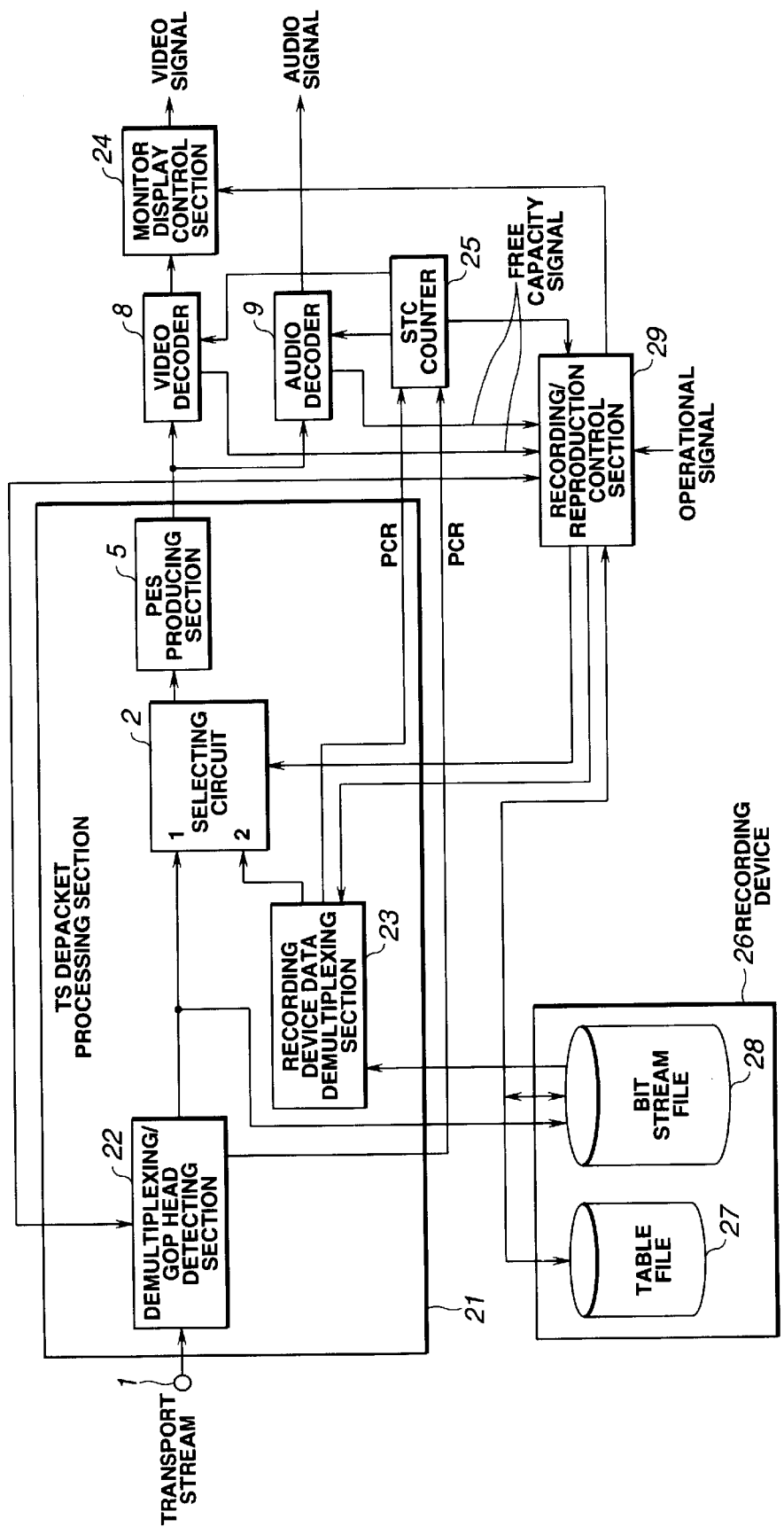
FIG. 2 is a block diagram showing an embodiment of a recording/reproducing apparatus according to the present invention.

A detailed description will be made hereinbelow of embodiments of the present invention with reference to the drawings. FIG. 2 is a block diagram showing an embodiment of a recording/reproducing apparatus according to this invention.

A transport stream is inputted to an input terminal 1. The transport stream corresponds to a multi-program, and at decoding a desired program packet is selectable from a plurality of programs to be transmitted in time division. For this selection, the transport packet is transmitted in a state where a link lever heater is added before a payload transmitting information. In this case, 4 bytes of 188 bytes of the transport packet forms the link level header.

In the link level header, a synchronous byte (sync_byte) lies at its head, then followed successively by a transport packed error indicator) indicative of the occurrence or no occurrence of a bit error, an unit start indicator (PES packet start indicator) indicative of the start of a PES packet, a transport packet priority (transport priority) representative of the degree of significance of a packet, a PID (Packet IDentification) forming information on packet identification, a scrambling control (transport scrambling control) representative of the occurrence or no occurrence of scrambling, an adaptation field control) representative of the presence or absence of a payload and a continuity counter representative of the continuity of the same PID.

The transport stream from the input terminal 1 is inputted to a demultiplexing/GOP head detecting section 22 of a TS depacket processing section 21. The demultiplexing/GOP head detecting section 22 demultiplexes the transport stream, and extracts and outputs only a packet corresponding to the PID, the user designates, at every classification. The output of the demultiplexing/GOP head detecting section 22 forms a partial transport stream, and is supplied to a recording device 26 and further given through a selecting circuit 2 to a PES producing section 5.

The PES producing section 5 receives video and audio packets corresponding to the PID the user designates, and produces video and audio PES data on the basis of payload data of the transport packet to give the video PES data to a video decoder 8 while giving the audio PES data to an audio decoder 9.

The video decoder 8 and the audio decoder 9 receive an output of a STC counter 25, which will be described herein later, to decode the inputted video or audio PES data, thereby outputting a video signal and an audio signal, respectively. The video signal is led to a monitor display control section 24. The monitor display control section 24 undergoes the control by a recording/reproduction control section 29, which will be described herein later, and conducts conversion processing of the video signal for display and outputs the conversion processing result to a monitor (not shown). Further, the audio output signal from the audio decoder 9 is forwarded to devices such as a speaker (not shown).

The recording/reproducing control section 29 receives operational signals issued by the user's operation. The recording/reproduction control section 29 is made to set various modes including a recording mode, an ordinarily reproducing mode and a time shift reproducing mode on the basis of the operational signals. The recording/reproduction control section 29 controls the demultiplexing/GOP head detecting section 22 in the recording mode to implement the recording mode processing, while controlling a recording device data demultiplexing section 23 in the reproducing mode for conducting the reproducing mode processing.

The demultiplexing/GOP head detecting section 22, in the recording mode, extracts a packet of the PID designated in recording by the user's operation to output a bit stream to the recording device 26. In this embodiment, the demultiplexing/GOP head detecting section 22 is made to output, to the recording device 26, a PCR (Program Clock Reference) value at a GOP (Group Of Picture) head timing.

A PCR packet is inserted into a stream at a given interval to act as a time reference in the stream. According to the MPEG2 standard, in-frame encoded data (I picture) is put in each GOP comprising data on a plurality of predetermined screens. As compared with this GOP period, the PCR period is sufficiently shorter and, if ignoring an error, it can be considered that a predetermined PCR insertion timing and a GOP head timing substantially coincide with each other. Accordingly, this permits a PCR value in the vicinity of the GOP head timing to be used as time information representative of the GOP head timing.

When detecting that a packet at the GOP head, of packets to be recorded, is demultiplexed by the demultiplexing/GOP head detecting section 22, the recording/reproduction control section 29 resets a counter variable, indicative of the number of transfer packets at every GOP, to 0 and increments the following variable at every packet demultiplexing, and further counts the number of packets before or up to the next GOP head. The recording/reproduction control section 29 outputs information on the number of packets in GOP to the recording device 26.

The recording device 26 stores, as a bit stream file 28, a file comprising a partial transport stream demultiplexed by the demultiplexing/GOP head detecting section 22. As the bit stream file 28, stored is only a desired program of the PID the user designates.

In addition, the recording device 26 stores, as a table file 27, a file including time information on a GOP head timing and information on the number of GOP packets. As the time information indicative of the GOP head timing, for example, the PCR value at the GOP head timing is used. Besides, as the time information, it is also appropriate to use, for example, the time information the recording/reproduction control section 29 has, that is, the information obtainable by the OS (Operating System), a timer in the interior of the equipment or the like. Further, it is also acceptable to use a PTS or DTS value which is a time stamp value added to a video or audio bit stream. Still further, it is also possible to store information on the number of bytes (bits) of the GOP instead of the information on the number of GOP packets.

The recording device data demultiplexing section 23, under the control by the recording/reproduction control section 29, reads out a bit stream recorded in the recording device 26 and then demultiplexes it to output a packet based upon the user's operation to the selecting circuit 2 at every classification. The selecting circuit 2, under the control by the recording/reproduction control section 29, selects one of the output of the demultiplexing/GOP head detecting section 22 and the output of the recording device data demultiplexing section 23 to output the selection result to the PES producing section 5.

The STC counter 25 receives the supply of PCRs extracted by the demultiplexing/GOP head detecting section 22 and the recording device data demultiplexing section 23. The STC counter 25 develops the time in a manner that reference is made to the PCR, and outputs a STC, forming its count value, to the video and audio decoders 8 and 9. The video and audio decoders 8, 9 compare the STC with the DTS and the PTS in a stream for the time control in decoding.

Figure 3:
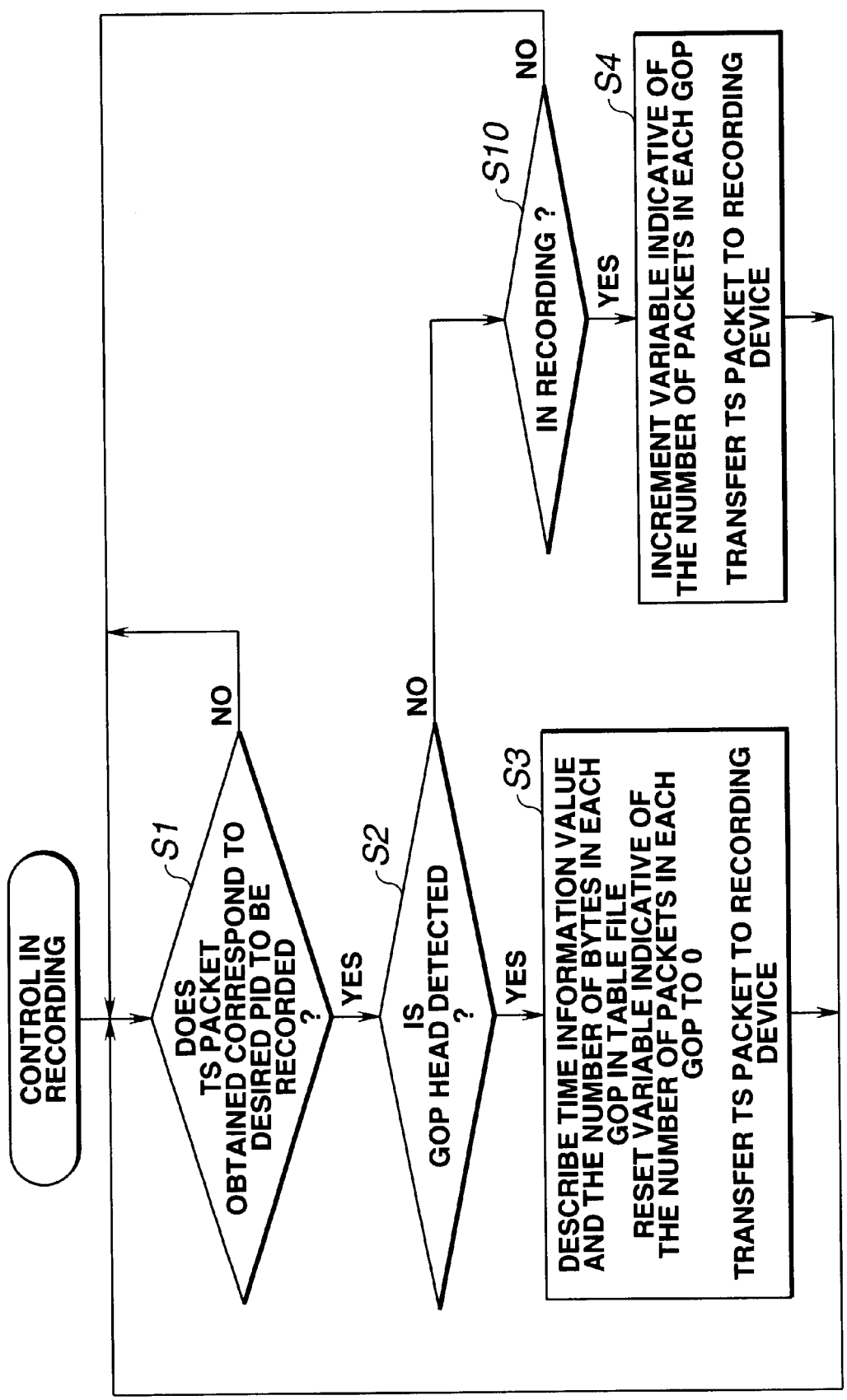
FIG. 3 is a flow chart for explaining an operation of the embodiment shown in FIG. 2.
Figure 4:
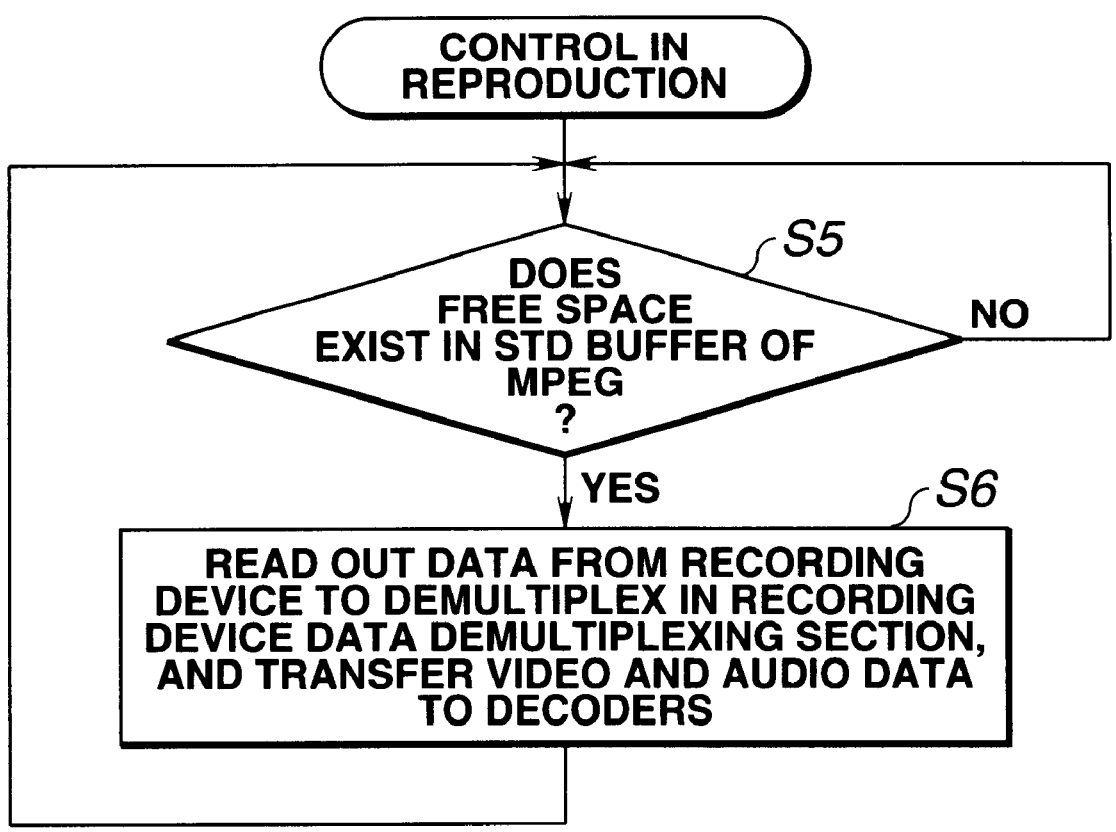
FIG. 4 is a flow chart for explaining an operation of the embodiment shown in FIG. 2.
Figure 5:
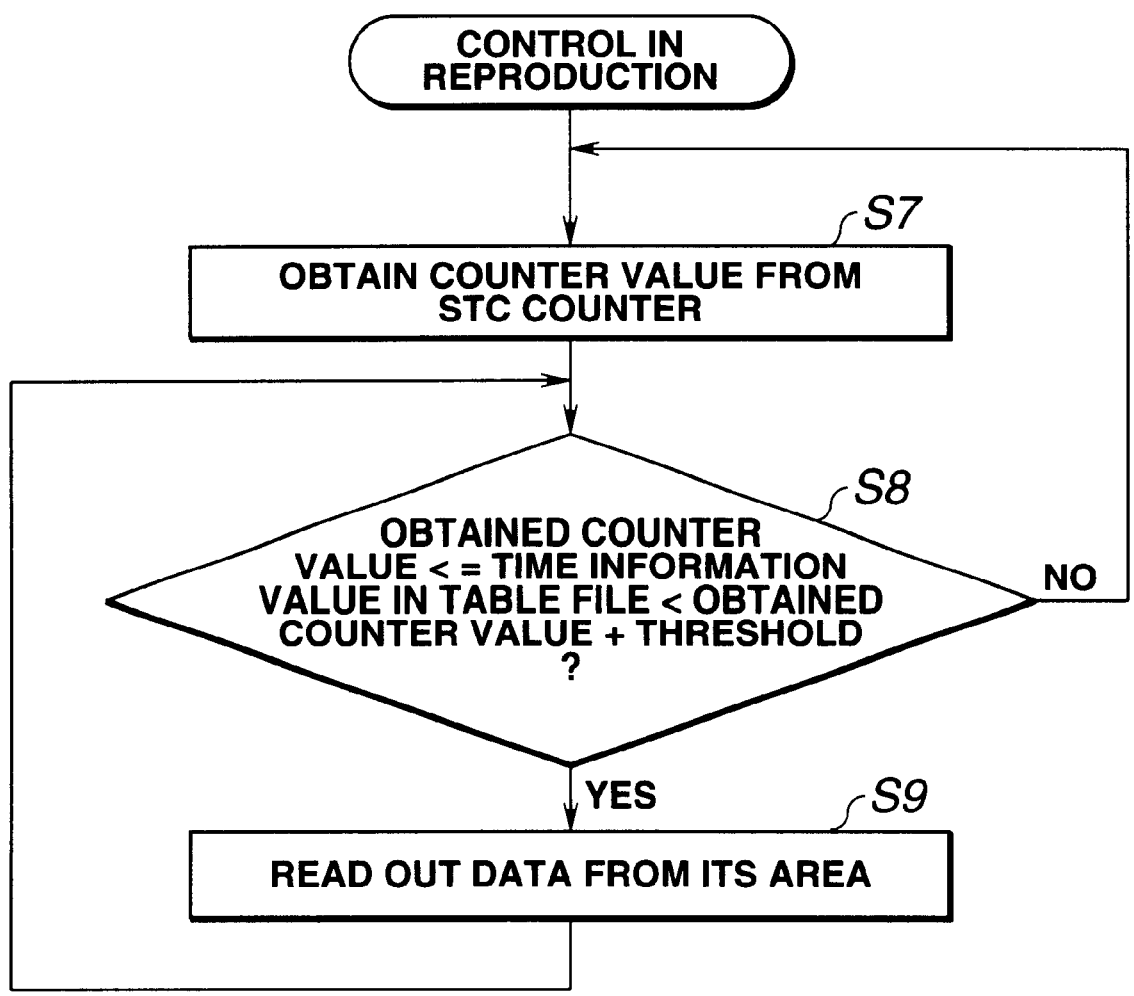
FIG. 5 is a flow chart for explaining an operation of the embodiment shown in FIG. 2.
Figure 6:
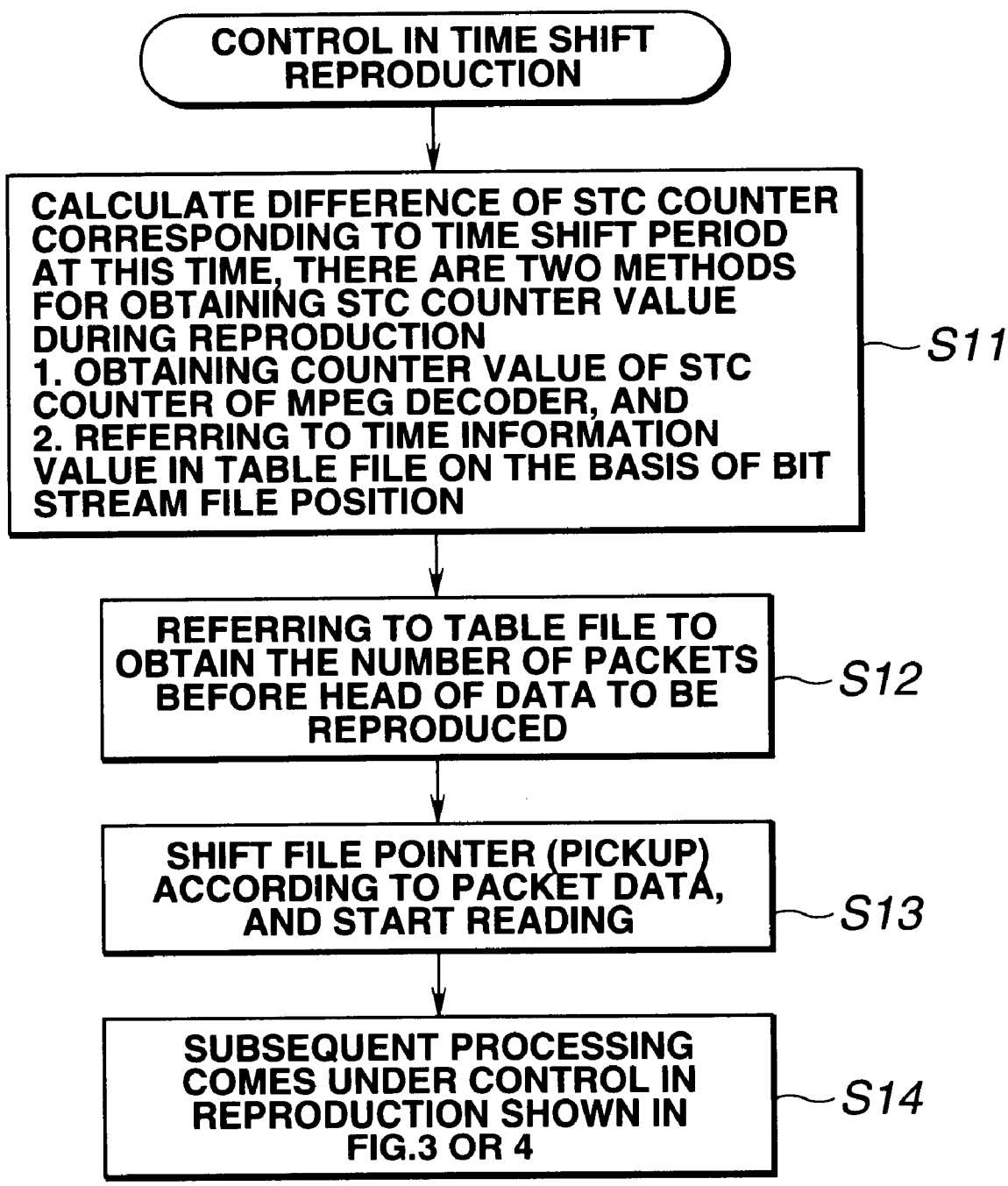
FIG. 6 is a flow chart for explaining an operation of the embodiment shown in FIG. 2.
Figure 7:
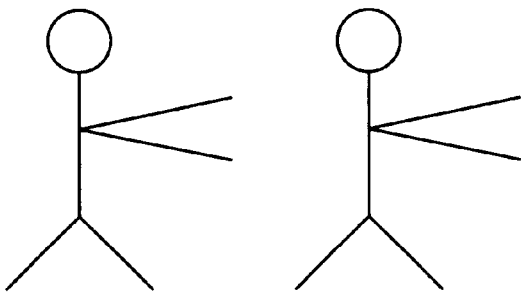
FIG. 7 is an explanatory illustration for describing an operation of the embodiment shown in FIG. 2.
Figure 8:
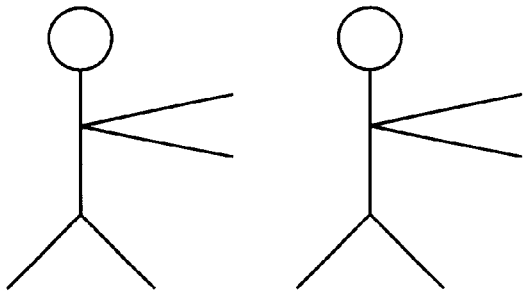
FIG. 8 is an explanatory illustration for describing an operation of the embodiment shown in FIG. 2.
Figure 9:
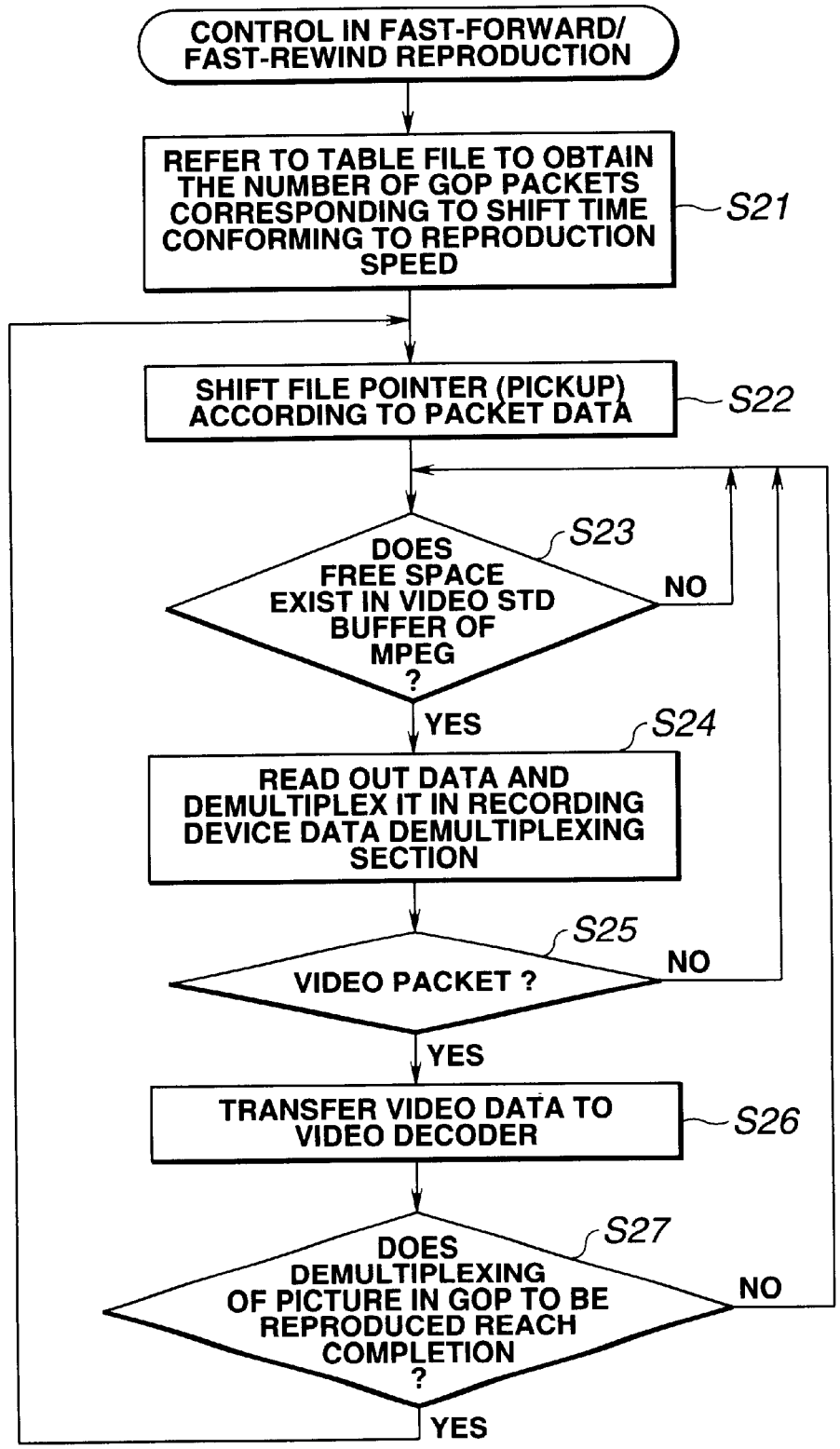
FIG. 9 is a flow chart for explaining an operation of the embodiment shown in FIG. 2.

Secondly, an operation of the embodiment thus arranged will be described hereinbelow with reference to the flow chars of FIGS. 3 to 6, the explanatory illustrations of FIGS. 7 and 8 and the flow chart of FIG. 9. FIG. 3 shows an operation in recording, FIGS. 4 and 5 shows an operation in reproduction, FIG. 6 illustrates an operation in time shift reproduction, and FIG. 9 illustrates an operation in special reproduction.

A transport stream inputted to the input terminal 1 is supplied to the demultiplexing/GOP head detecting section 22 of the TS processing section 21. The demultiplexing/GOP head detecting section 22 demultiplexes the inputted transport stream and extracts and outputs a packet corresponding to the PID the user designates at every classification. In the case of displaying a program based upon the inputted transport stream, the recording/reproduction control section 29 makes the selecting circuit 2 select the output of the demultiplexing/GOP head detecting section 22. In this case, desired video and audio packet data are given to the PES producing section 5.

The PES producing section 5 produces video and audio PES data from payload data of a plurality of transport packets. The video PES data is supplied to the video decoder 8 while the audio PES data is fed to the audio decoder 9.

On the other hand, the STC counter 25 receives PCRs separately extracted by the demultiplexing/GOP head detecting section 22. If the inputted packet conforms to the PID of the PCR, its value is loaded in the STC counter 25 to set the counter value. The STC counter 25 counts up by a predetermined clock, and outputs that value to the video decoder 8 and the audio decoder 9.

Besides, whenever the PCR packet is demultiplexed and the PCR value is obtained, the demultiplexing/GOP head detecting section 22 holds its latest value in an internal variable.

The video decoder 8 and the audio decoder 9 control the decoding time on the DTS, the PTS in the inputted stream, and the STC to decide the inputted video and audio PES data. An audio signal from the audio decoder 9 is give to a speaker (not shown), while a video signal from the video decoder 8 is supplied through the monitor display control section 24 to a monitor (not shown). In this way, a picture of a program, the user desires, of the transport stream inputted through the input terminal 1 becomes visible.

Furthermore, referring to FIG. 3, a description will be made hereinbelow of an operation in recording.

Let it be assumed that the recording/reproduction control section 29 sets a recording mode in response to an operational signal by the user. In FIG. 3, at a step S1, the demultiplexing/GOP head detecting section 22 first decides whether or not the inputted packet signal coincides with a desired picture PID to be recorded. Among the packets to be recorded, there are a PCR packet, various control packets and others in addition to the video and audio packets the user desires. If the PID of the inputted packet coincides with the PID of the packet to be recorded, the next step S2 follows to decide whether or not it forms the head of the GOP.

Methods of detecting the GOP head include a way of detecting a random access indicator (random_access_ indicator) in an adaptation field (see ISO/IEC13818-1) of a transport stream and an approach of actually detecting a GOP start code.

If not forming the GOP head, a step S10 follows to see if the recording already begins. If not beginning, the operational flow returns to the step S1.

If the decision of the step S2 shows the GOP head, at a step S3 the recording/reproduction control section 29 resets a variable, indicative of the number of packets in each GOP, to 0. The demultiplexing/GOP head detecting section 22 gives the extracted TS packet to the recording device 26. The recording device 26 records the inputted TS packet as the bit stream file 28. Additionally, the demultiplexing/GOP head detecting section 22 or the recording/reproduction control section 29 records time information on the GOP head, for example the PCR value, as the table file 27 of the recording device 26.

If the decision of the step S2 shows that the inputted packet does not form the GOP head, the operational flow proceeds to the processing at the step S10 and a step S4, and the recording/reproduction control section 29 increments the variable representative of the number of packets for each GOP. Further, the demultiplexing/GOP head detecting section 22 gives this TS packet to the recording device 26 to record it as the bit stream file 28.

If the detection of the next GOP head occurs at the step S2, at the step S3 the recording/reproduction control section 29 makes the recording device 26 record the number of packets the time information as the table file 27 at every GOP.

Thereafter, with the repetition of the same operations, only the desired TS packet depending upon the user's operation is recorded as the bit stream file 28, while the time information on the GOP head timing and the information on the number of GOP packets are recorded as the table file 27. Besides, it may also be considered to provide a configuration in which the PID value corresponding to each of the streams recorded as the bit stream file 28 is also recorded as the table file 27.

As mentioned above, it is also appropriate to use the value of a timer the receiving unit or the OS retains, as the time information to be recorded as the table file 27. In the case of using the PCR, when a discontinuity indicator (discontinuity_indicator) (a flag taking an active condition when a counter for packets with the same PID value becomes discontinuous; see ISO/IEC13818-3) for a packet including a PCR comes to 1 during that GOP period, or when the PID to be demultiplexed by an operational signal such as a user channel switching signal is altered so that the PCR value becomes discontinuous, the PCR at that time is also written in the table file 27.

Moreover, if there is a need to multiplex, in the bit stream file 28, a data packet describing control data for indicating the fact that a discontinuity takes place at such a discontinuous point, the demultiplexing/GOP head detecting section 22 multiplexes that data packet to record it in the bit stream file 28.

Owing to the above-described operations, the bit stream file 28 and the table file 27 describing the number of packets and the PCR value in each GOP are recordable in the recording device 26. In this way, the picture of the program the user selects and the audio bit stream are recordable.

Furthermore, in the case of recording a plurality of programs through this recording operation, pluralities of pictures, voices and PIDs on the PCR are designated and demultiplexed so that the table file is produced and recorded at every program.

Still further, in recording, in addition to the PCR, the video data and the audio data, section data such as a PAT and a PMT (see ISO/IEC13818-1) are recorded simultaneously. The PAT describes the PID value of the PMT existing at every channel, while the PMT describes the PID values of the PCR, the picture and the voice in that program. Accordingly, the acquisition of the PAT and the PMT permits the reproduction of pictures and voices. At the recording, these PAT and PMT are recorded in the bit stream file 28 and, in place of the PID values of the picture and the voice, a program number (program_number) value representative of a channel number (a service ID is acceptable) is recorded in the table file 27.

In this embodiment, the recording starts at the GOP head in this way. If the recording does not take place at the GOP head, the reproducible data before the GOP head is recorded wastefully. In the digital broadcasting which has currently come into widespread use, 15 pictures constitute 1 GOP, and in the present television system, images corresponding to 30 frames are transmitted for 1 second. For this reason, if the recording from the GOP head does not take place, the operation for the arrival at the head takes a maximum of approximately 0.5 second.

Furthermore, a description will be given hereinbelow of the processing to be conducted at the ordinary reproduction. The ordinary reproduction processing control can employ two ways shown in FIGS. 4 and 5.

A description will begins at the example of FIG. 4. At the start of reproduction, the recording/reproduction control section 29 reads out the picture and voice PID values from the table file 27 to obtain the PID values and sets them in the recording device data demultiplexing section 23. The recording/reproduction control section 29 sets, in the STC counter 25, a PCR value in a packet, coinciding with the PID of the initial PCR.

Subsequently, a check is made on the free capacity in buffers of the video decoder 8 and the audio decoder 9. Each of the video decoder 8 and the audio decoder 9 has a STD buffer for holding PES data inputted, and outputs a free capacity signal indicative of the free capacity of this STD buffer to the recording/reproduction control section 29. The recording/reproduction control section 29, at a step S5, checks, on the basis of the free capacity signal, whether or not the STD buffer has a free space or area. If the free space exists, the recording/reproduction control section 29 reads out a bit stream from the bit stream file 28 and transfers it to the recording device data demultiplexing section 23.

The recording device data demultiplexing section 23 demultiplexes the inputted bit stream to supply it to the selecting circuit 2. In this case, the selecting circuit 2 selects the output of the recording device data demultiplexing section 23, with the reproduced packet being supplied to the PES producing section 5 at every classification. The PES producing section 5 produces video PES data and audio PES data from the inputted packet and separately supplies them to the video decoder 8 and the audio decoder 9. Subsequently, the operational flow returns to the free capacity check routine to repeat the same operation.

The processing subsequent to the decoding is the same as described above.

Furthermore, the PAT and the PMT are also recorded, the recording device data demultiplexing section 23 reads out a program number value from the table file 27 to derive a PID of the PMT from the PAT data. Then, the PID of that PMT is set in the recording device data demultiplexing section 23 to obtain the PMT so that the PID values of the PCR, a picture and a voice are attained from the data in the PMT. The other processing is like the processing described above.

Still further, referring to FIG. 5, a description will be made hereinbelow of the other reproduction control. Although in FIG. 4 the readout from the bit stream file 28 is controlled on the basis of the free capacity of the STD buffer, in FIG. 5 it is controlled by a time stamp value (STC counter value).

In FIG. 5, at a step S7, the recording/reproduction control section 29 obtains the STC counter value from the STC counter 25. At a step S8, the recording/reproduction control section 29 makes a comparison in magnitude between the obtained STC counter value and the PCR value from the table file 27. That is, the recording/reproduction control section 29 sees if the PCR value is in a range from the STC counter value to a predetermined threshold, and data corresponding to the PCR value within this range is read out from the bit stream file 28 (step S9).

Besides, if the time information depends upon the timer value in the interior of the receiver (or OS), data corresponding to the range including the time information up to a value obtained by adding the converted value of the threshold into the time information are read out therefrom. The threshold is determined on the basis of the capacity of the STD buffer.

Through the reproduction processing shown in FIG. 4 or 5, the normal reproduction is feasible without the occurrence of the overflow or underflow of the STD buffer.

In this instance, it is obvious that the recording and the reproduction can be controlled simultaneously so that the bit stream is read out from the recording device 26 for the decoding while the inputted program is recorded.

Furthermore, referring to FIG. 6, a description will be given hereinbelow of the processing in time shift reproduction. Incidentally, in the time shift reproduction, the recording and the reproduction are conducted simultaneously, and the recording processing is the same as described above and the description thereof will be omitted for brevity. In this embodiment, in the time shift reproduction, the reproduction is done from the GOP head.

When the user gives an instruction for the time shift reproduction through the use of an operational signal and sets a shift time, the recording/reproduction control section 29 changes data to be read out on the basis of the designated shift time. That is, if the time information in the table file 27 is the time counted in the interior of the receiver (or OS), the recording/reproduction control section 29 calculates the time corresponding to data to be shift-reproduced (the time corresponding to the shifting destination) by adding a shift time to the time information corresponding to the data being currently in reproduction (step S11).

Following this, the time information closest to the time of the shifting destination or objective is searched in the table file 27, and the number of packets existing before the searched time information, that is, the number of packets before the GOP head being the shifting destination, is calculated on the basis of the information on the number of packets in each GOP (step S12).

On the other hand, if the time information in the table file 27 is a PCR value, the recording/reproduction control section 29 calculates the number of packets corresponding to the time shift period on the basis of the STC count value. That is, the recording/reproduction control section 29 obtains the STC counter value corresponding to the data being in display at a step S11 of FIG. 6. Subsequently, at a step S12, the recording/reproduction control section 29 calculates the STC counter value at the shifting destination on the basis of the obtained STC counter value and the shift time and searches the PCR value closest to the counter value from the table file 27 to calculate the number of packets up to the searched PCR value, that is, the number of packets before the GOP head being the shifting destination.

At the next step S13, a file pointer, if the recording device 26 is a hard disk, or a pickup, if it is an optical disk, is shifted according to the number of packets calculated, thereby starting the readout from the file. After the start of the readout, the data transfer is made according to the above-mentioned reproduction method shown in FIG. 4 or 5.

In this embodiment, since the recording begins at the GOP head in recording, the shift reproduction can be started immediately after the shifting.

In addition, there is the case that a PCR value is used as the time information and a discontinuity indicator assumes 1 before reaching the shifting destination or the case that the channel switching occurs before the shifting destination. In these cases, a shift time to be taken until a PCR value becomes discontinuous is calculated and subtracted from the total shift time. Subsequently, the STC counter value at the shifting destination is calculated on the basis of the subtraction result time for searching, and the number of packets up to that time is calculated. Even in the case of the occurrence of the discontinuity of PCR, such processing permits sure acquisition of the number of packets before the shifting destination.

Still additionally, in this embodiment, the display of the shift time is possible in the time shift reproduction. That is, the recording/reproduction control section 29 calculates the shift time on the basis of the time information corresponding to the data being currently recorded and the time information value at the shifting destination. The recording/reproduction control section 29 outputs the calculated shift time to the monitor display control section 24. The monitor display control section 24 outputs a video signal in which the shift time is imposed.

Moreover, in the case that the shift time is displayed, if the time information value at the head of the bit stream being recorded is additionally obtained, it is possible to display a shiftable time before and after it in place of the display of the shift time. FIG. 7 shows an example of display of the shift time, while FIG. 8 illustrates an example of display of the shiftable time. FIG. 7 shows the display of a program taken 10 minutes before the program being currently recorded. Furthermore, FIG. 8 illustrates the possibility of the display of the program taken 5 minutes before the program being currently displayed through program to be taken 3 minutes after that time.

Furthermore, referring to FIG. 9, a description will be made hereinbelow of the control in the fast-forward/fast-rewind reproduction, which is an example of special reproduction of data recorded.

In the fast-forward/fast-rewind reproduction, for example, only the I picture or only I and P pictures, but not all data, are put to reproduction. The recording/reproduction control section 29 reads out and decodes a picture at a STC counter value interval depending upon the shift time interval. That is, at a step S21 the recording/reproduction control section 29 obtains the number of packets corresponding to the STC counter value interval, to be shifted, on the basis of the information in the table file 27. At a step S22 the pickup or the file pointer is shifted according to the number of packets.

The operational flow goes to the next step S23 to check a STD buffer free capacity signal in the video decoder 8 for confirming the presence of a free space. If there is no free space, it waits for the occurrence of a free space. If confirmation is made to the presence of a free space, the recording device data demultiplexing section 23 reads out the data to demultiplex it.

Subsequently, a step S25 follows to see if the data demultiplexed is a video packet. If it is not the video packet, since there is not need to conducting the processing thereof, the operational flow returns to the free capacity check routine of the step S23. On the other hand, if the packet read out is the video packet, the packet is given to the PES producing section 5 to produce video PES data. At as step S26, the PES data is supplied to the video decoder 8 to be subjected to the decoding processing.

As described above, depending upon the reproduction speed, all the I and P pictures in GOP can be decoded, or only the I picture can be decoded. Accordingly, at a step S27, the recording/reproduction control section 29 decides whether or not the demultiplexing processing for all the pictures in GOP, to be reproduced, reach completion.

For instance, the decision on the completion of the demultiplexing processing can be made in a manner that the video decoder 8 gives a decode completion signal for each picture to the recording/reproduction control section 29. Alternatively, it can also be made in a manner that the recording device data demultiplexing section 23 detects the header of a picture and hands the detection result over to the recording/reproduction control section 29. When the readout of the picture in GOP, to be reproduced, reaches completion, the operational flow proceeds to a step S22 to shift the pickup or the like for changing the readout objective to the GOP head to be reproduced next. If the readout of all the pictures in GOP, to be reproduced, does not reach completion, the operational flow again returns to the free capacity check routine. With the repetition of the above-described operation, the fast-forward/fast-rewind reproduction is realizable.

Besides, in this embodiment, although the table file 27 stores the number of transfer packets in each GOP, it is also appropriate that the number of packets (the number of bytes (the number of bits)) in total, but not in each GOP, is written therein.

Thus, according to this embodiment, by the separate recording according to a program, a disk medium having a relatively small capacity is used as a recording medium to facilitate the time shift reproduction, and in a manner that the recording is made from the GOP head at the recording and the reproduction is made through the shifting to the GOP head in the reproduction, accurate and quick time shift reproduction is feasible. Additionally, the display of the time shift period is also possible.

Figure 10:
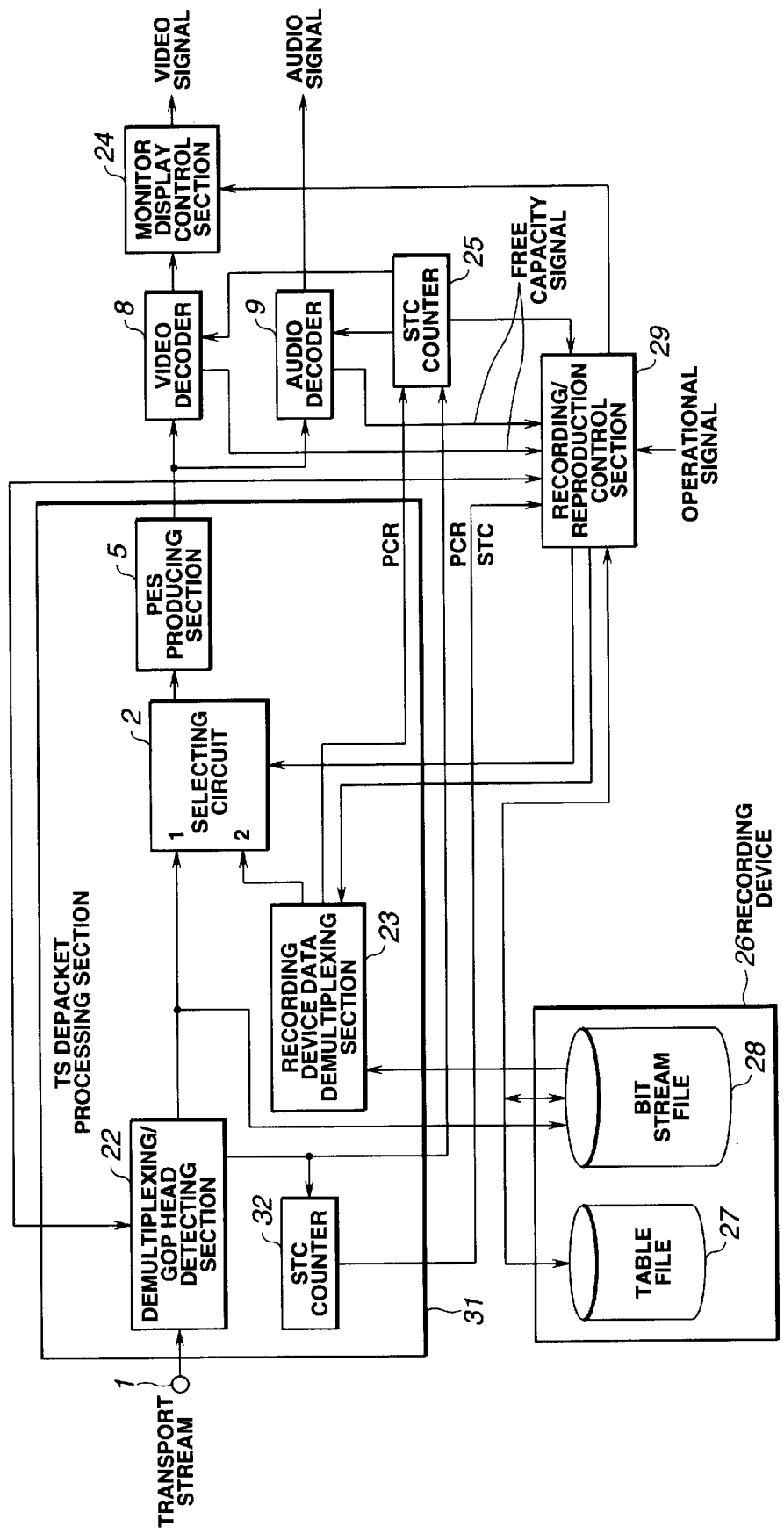
FIG. 10 is a block diagram showing another embodiment of this invention.

FIG. 10 is a block diagram showing another embodiment of this invention. In FIG. 10, the same components as those in FIG. 2 are marked with the same numerals, and the description thereof will be omitted for brevity.

This embodiment differs from the embodiment shown in FIG. 2 in that the TS depacket processing section 31 includes a STC counter 32. The STC counter 32 receives a PCR value from the demultiplexing/GOP head detecting section 22, and counts this PCR value to obtain a STC.

In the embodiment thus arranged, the recording/reproduction control section 29 can write a count value of the STC counter 32 as the time information in the table file 27. The other operations are the same as those in embodiment shown in FIG. 2.

Accordingly, in this case, there is no need to hold the PCR value in the interior of the demultiplexing/GOP detecting section 22.

Also in this embodiment, it is possible to offer the same effects as those of the embodiment of FIG. 2.

Figure 11:
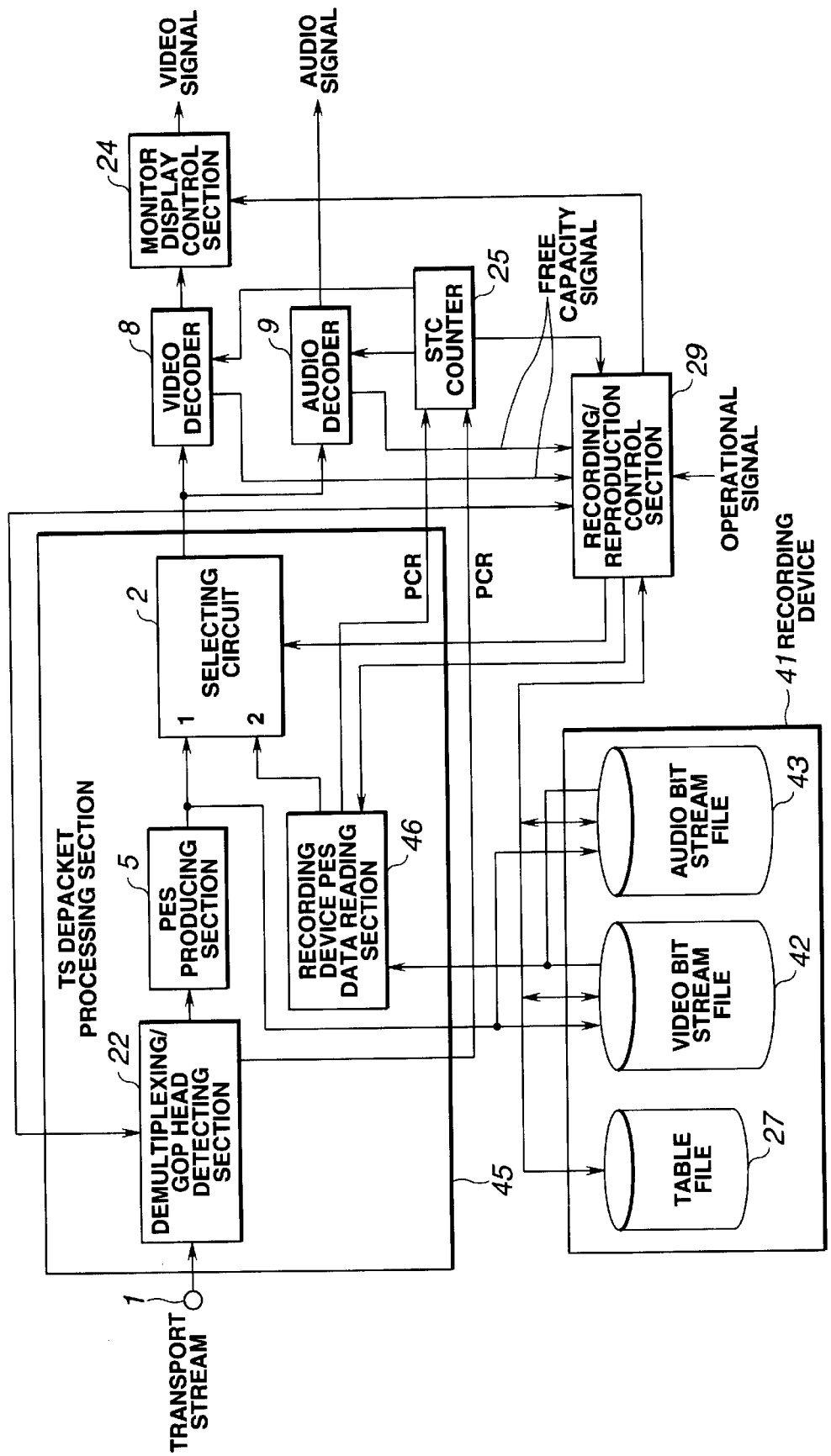
FIG. 11 is a block diagram showing still another embodiment of this invention.

FIG. 11 is a block diagram showing a still another embodiment of this invention. In FIG. 11, the same components as those in FIG. 2 are marked with the same numerals.

In the embodiment shown in FIG. 2, the transport packet is recorded as the bit stream file 28 in the recording device 26. Contrary to this, in this embodiment, separate PES-format files for a picture and a voice are recorded as bit stream files.

In this embodiment, unlike the recording device 26 shown in FIG. 2, a recording device 41 has a video bit stream file 42 and an audio bit stream file 43 as bit stream files. In addition, unlike the TS depacket processing section 21 in FIG. 2, a TS depacket processing section 45 is constructed to use a recording device PES data reading section 46 in place of the recording device data demultiplexing section 23, and a selecting circuit is provided following the PES producing section 5.

The demultiplexing/GOP head detecting section 22 outputs packet data to the PES processing section 5 at every classification. The PES producing section 5 produces video PES data and audio PES data from the inputted packet data and outputs them to the selecting circuit 2. In this embodiment, the video PES data and the audio PES data from the PES producing section 5 are recorded as the video bit stream file 42 and the audio bit stream file 43, respectively.

Furthermore, the recording device PES data reading section 46 reads out video and audio PES data from the video bit stream file 42 and audio bit stream file 43 to output them to the selecting circuit 2.

The other configuration is the same as that of the FIG. 2 embodiment.

Secondly, referring to the flow charts of FIGS. 12 to 15, a description will be made hereinbelow of an operation of the embodiment thus constructed. FIGS. 12 to 15 illustrate the operational flows in recording, reproduction, time shift reproduction and fast-forward/fast-rewind reproduction. In FIGS. 12 to 15, the same procedures as those in FIGS. 3 to 6 and 9 are marked with the same reference numerals, and the description thereof will be omitted for simplicity.

Figure 12:
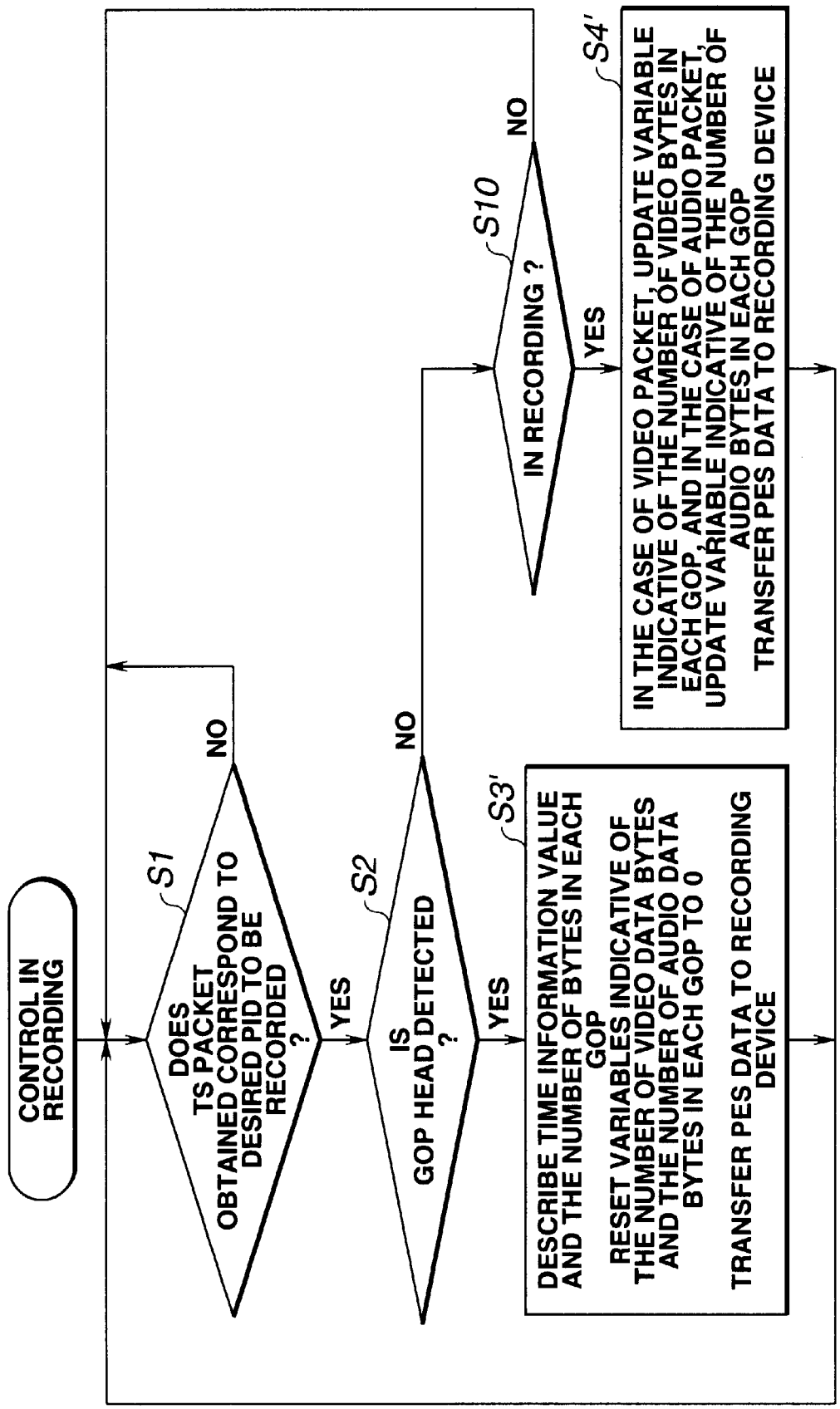
FIG. 12 is a flow chart for explaining an operation of the embodiment shown in FIG. 11.

At the recording, as shown in FIG. 12, a point different from the operational flow shown in FIG. 3 is that steps S3' and S4' are taken in place of the steps S3 and S4. That is, the difference is that, at the recording, in place of the transport stream, PES data is stored in each of the stream files 42 and 43.

When the head of GOP is detected at the step S2, the next step S3' is implemented to reset variables indicative of the number of video data bytes and the number of audio data bytes, and further to the number of bytes in each GOP in the table file 27. Additionally, the recording/reproduction control section 29 puts the time information on the GOP head in the table file 27. Still additionally, the PES producing section 5 stores the corresponding video and audio PES data in the video and audio bit stream files 42 and 43.

In the case of being not at a GOP head, the operational flow shifts from the step S10 to the step S4' where the PES data producing section 5 stores the video and audio PES data in the corresponding video and audio bit stream files 42 and 43. Furthermore, the recording/reproduction control section 29 updates variables indicative of the number of video data bytes and the number of audio data bytes at every GOP.

In this way, also in this embodiment, the recording of the PES data can be made from the head of GOP.

Figure 13:
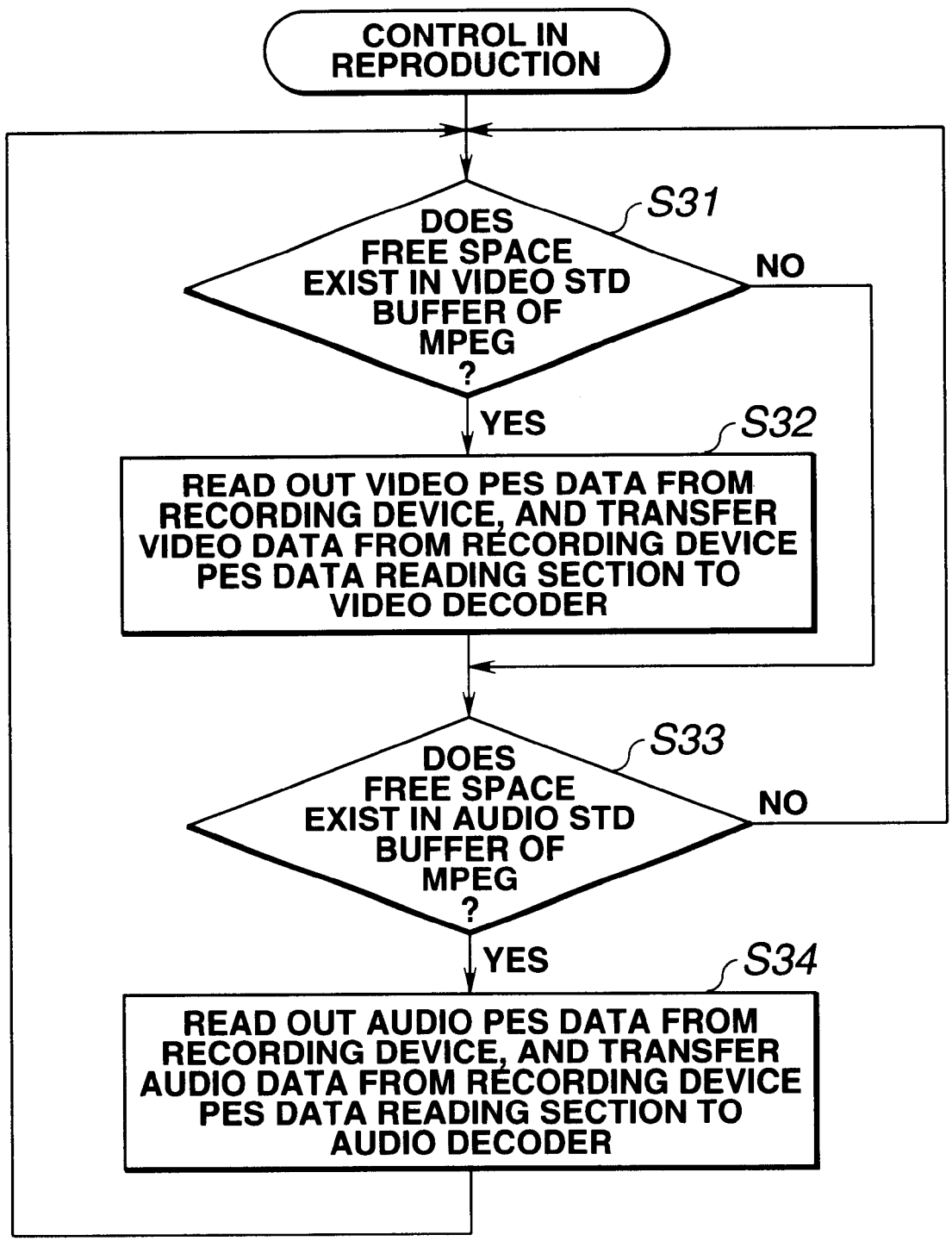
FIG. 13 is a flow chart for explaining an operation of the embodiment shown in FIG. 11.

In the reproduction, in addition to the method of conducting the control by the STC counter as shown in FIG. 5, there can be taken a method of implementing the control according to the STD buffer free capacity as shown in FIG. 13.

At steps S31 and S33 in FIG. 13, the recording/reproduction control section 29 checks, on the basis of the free capacity signals from the video and audio decoders 8 and 9, whether or not the video and audio STD buffers of the video and audio decoders 8 and 9 have a free area. If the video STD buffer or the audio STD buffer has a free area, at a step S32 or S34, the recording device PES data reading section 46 reads out the corresponding video or audio bit stream file 42 or 43 and transfers it through the selecting circuit 2 to the video or audio decoder 8 or 9.

Figure 14:
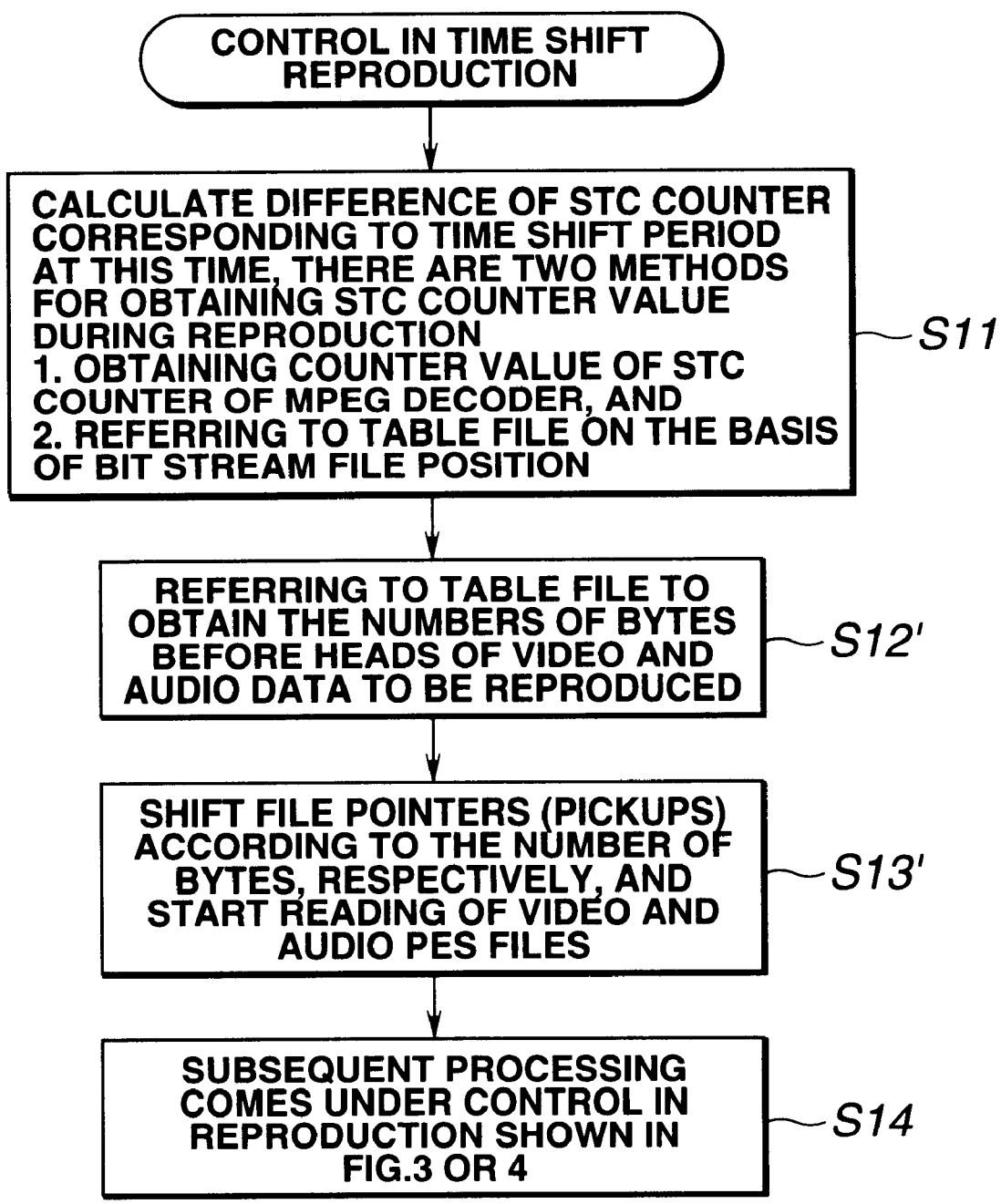
FIG. 14 is a flow chart for explaining an operation of the embodiment shown in FIG. 11.

The other operation is the same as that of the embodiment of FIG. 2. In the time shift reproduction, the processing is conducted as shown in FIG. 14. That is, first of all, at the step S11, as well as the embodiment of FIG. 2, the time information of the data being currently reproduced is obtained to calculate the time information at the shifting destination. For instance, the recording/reproduction control section 29 refers to the table file on the basis of the file position of the bit stream being read out to thereby obtain the time information of the data being currently reproduced, or acquires it from the count value of the STC counter 25. The time information value at the shifting destination is calculated from the obtained time value of the data under display and the shift time.

Subsequently, at a step S12', the time information value closest to the calculated time information value at the shifting destination is searched in the table file 27, and the data volume of the video and audio PES data up to that time is calculated in terms of the number of bytes. Then, at a step S13', the file pointer, if the recording device is a hard disk, or the pickup, if the recording device is an optical disk, is shifted according to that number of bytes and the readout from the file begins.

The other operation is similar to that of the embodiment of FIG. 2.

Moreover, referring to FIG. 15, a description will be given hereinbelow of the control in the fast-forward/fast-rewind reproduction forming a special reproduction example.

At the step S21', the data quantity (the number of bytes) corresponding to the STC counter value interval depending upon the shift time interval is derived from the table file 27. Subsequently, at a step S22', the in the video data file is shifted by a quantity corresponding to the obtained data quantity. The readout of the audio data comes to a stop.

Following this, a step S23 is implemented to check whether or not a free space exists in the video STD buffer of the video decoder 8. If the free space exists, the recording device PES data reading section 46 reads out the data and transfers it to the video decoder 8 (step S41). Then, a step S42 is implemented to decide whether the transfer of a picture in GOP, to be reproduced, reaches completion. If the completion is not reached, the operational flow returns to the step S23. If the completion is reached, the operational flow returns to the step S22'.

For instance, the decision on the completion of the demultiplexing processing can be made in a manner that the video decoder 8 informs the recording/reproduction control section 29 of a decode completion signal for each picture, while can also be made in a manner that the recording device PES data reading section 46 detects the header of a picture and informs the recording/reproduction control section 29 of the detection thereof. With the repetition of the above-described operation, the fast-forward/fast-rewind reproduction is realizable.

Figure 16:
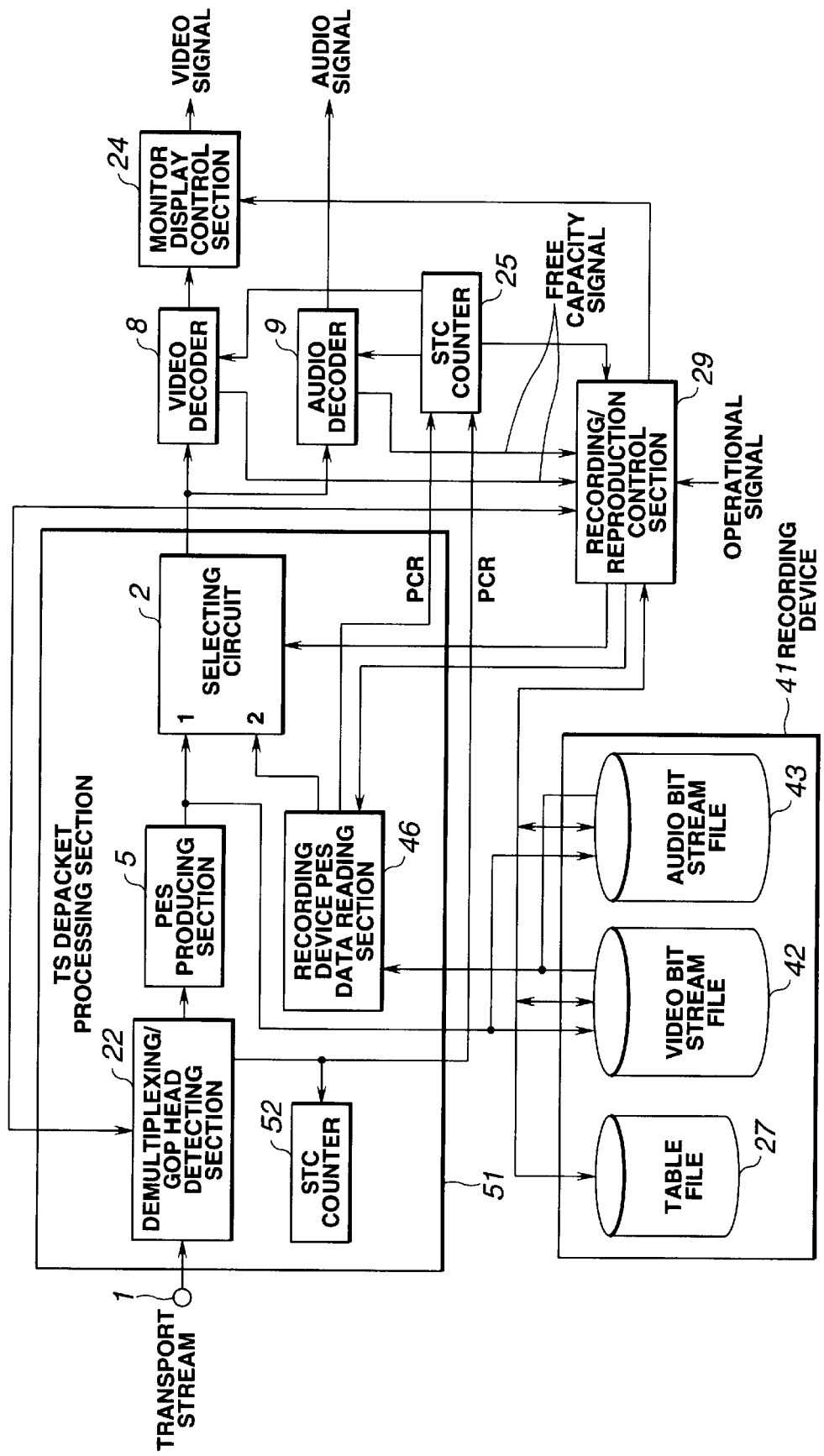
FIG. 16 is a block diagram showing a further embodiment of this invention.

FIG. 16 is a block diagram showing a further embodiment of this invention. In FIG. 16, the same components as those in FIG. 11 are marked with the same numerals, and the description thereof will be omitted for brevity.

This embodiment differs from the embodiment shown in FIG. 11 in that a TS depacket processing section 51 has a STC counter 52. The STC counter 52 receives a PCR value from the demultiplexing/GOP head detecting section 22, and counts this PCR value to provide a STC.

In the embodiment thus arranged, the recording/reproduction control section 29 can write the count value of the STC counter as the time information in the table file 27. The other operation is similar to that of the embodiment of FIG. 11.

Accordingly, also in this case, there is no need to maintain the PCR value in the interior of the demultiplexing/GOP detecting section 22.

It is obvious that this embodiment can also offer the same effects as those of the embodiment of FIG. 11.

Figure 17:
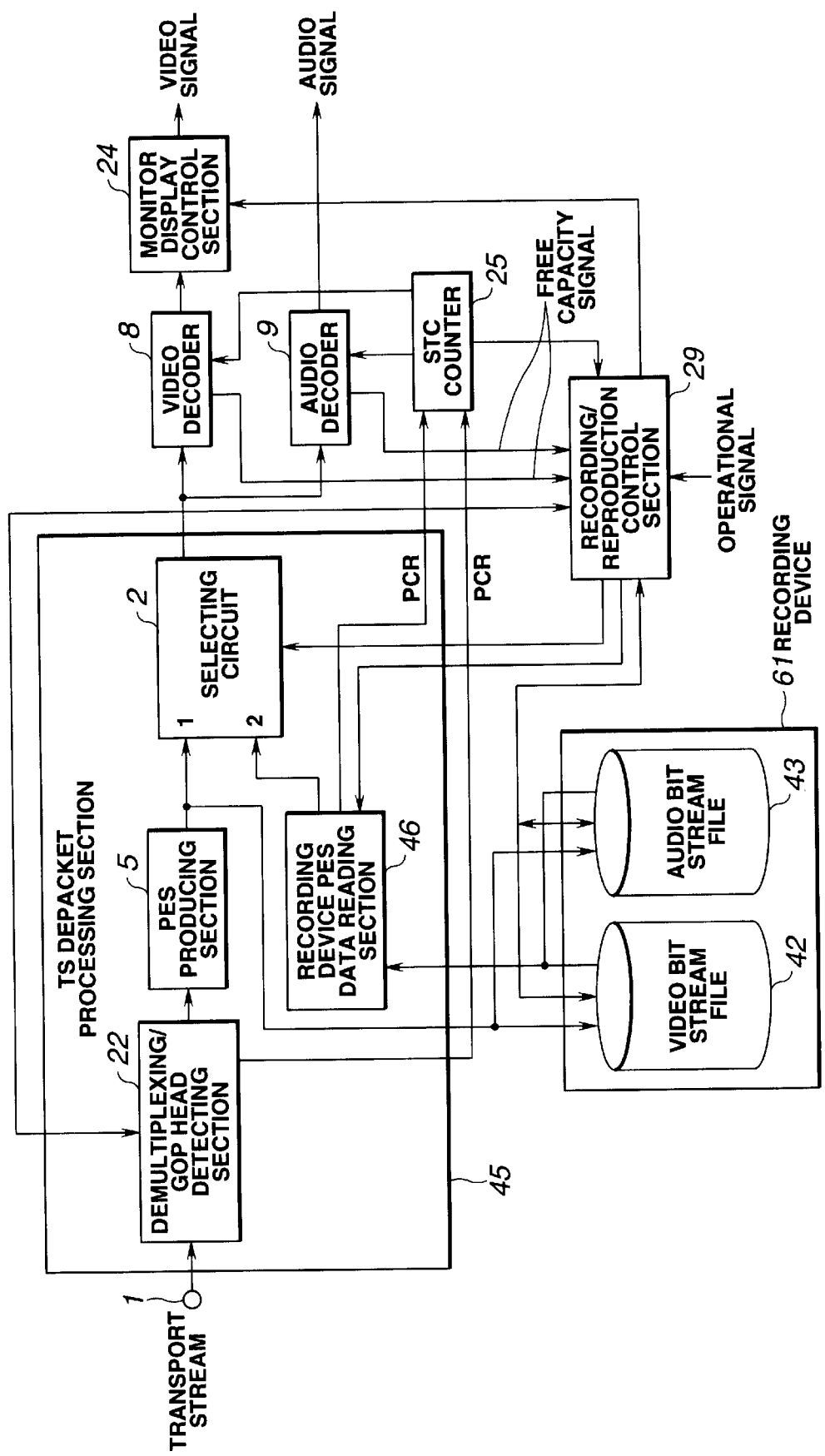
FIG. 17 is a block diagram showing a further embodiment of this invention.

FIG. 17 is a block diagram showing a further embodiment of this invention. In FIG. 17, the same components as those in FIG. 11 are marked with the same numerals, and the description thereof will be omitted for brevity.

Although in the above-described embodiment the time information and the information on the number of packets in GOP are stored in the table file in the recording, in this embodiment these information are recorded in a PES private data (PES_private_data) area of the PES header in a multiplexed state.

In this embodiment, a recording device 61 differs from the recording device 41 in FIG. 11 in that the table file is omitted, and the control by the recording/reproduction control section 29 is different from that of the embodiment shown in FIG. 11.

Figure 18:
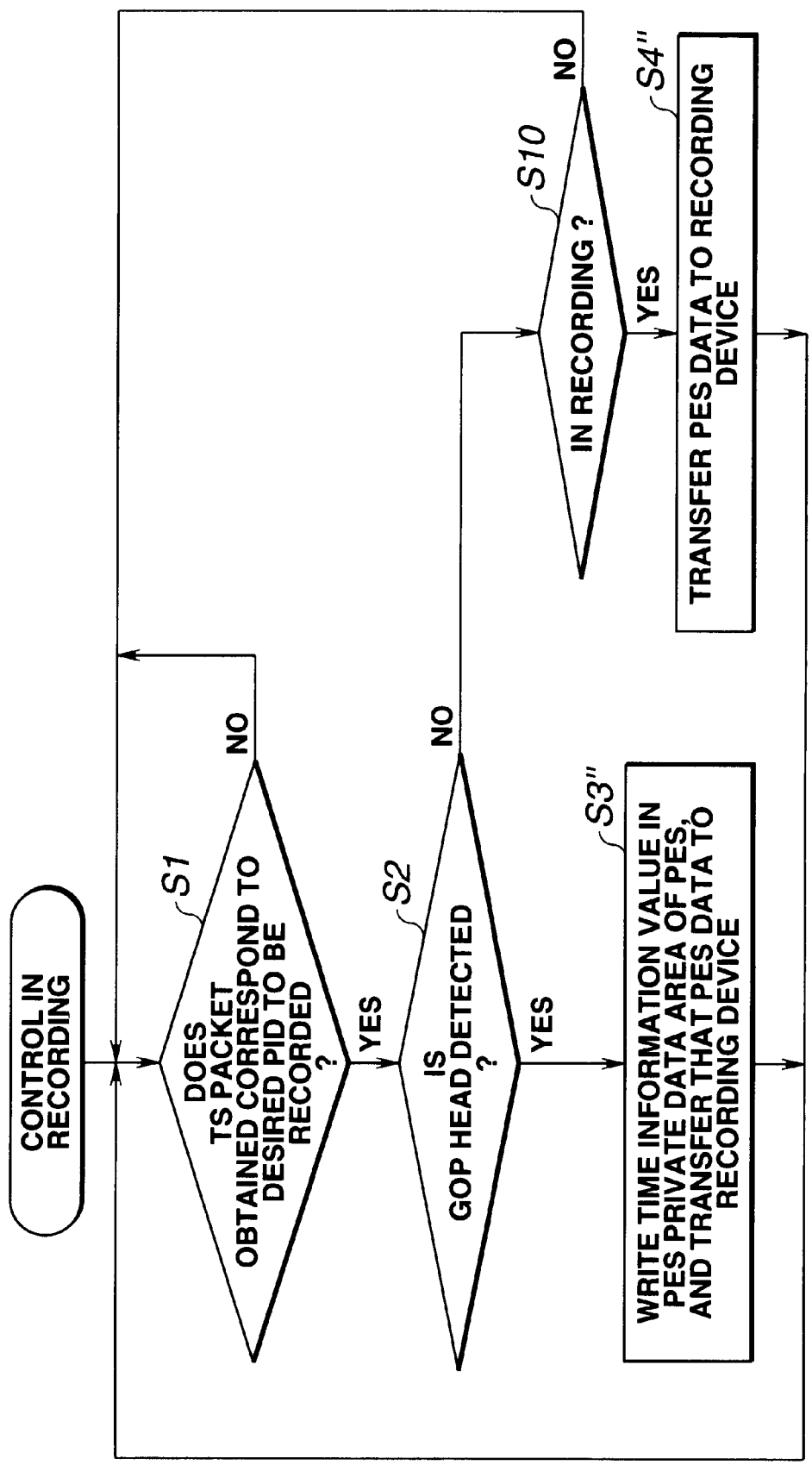
FIG. 18 is a flow chart for explaining an operation of the embodiment shown in FIG. 17.
Figure 19:
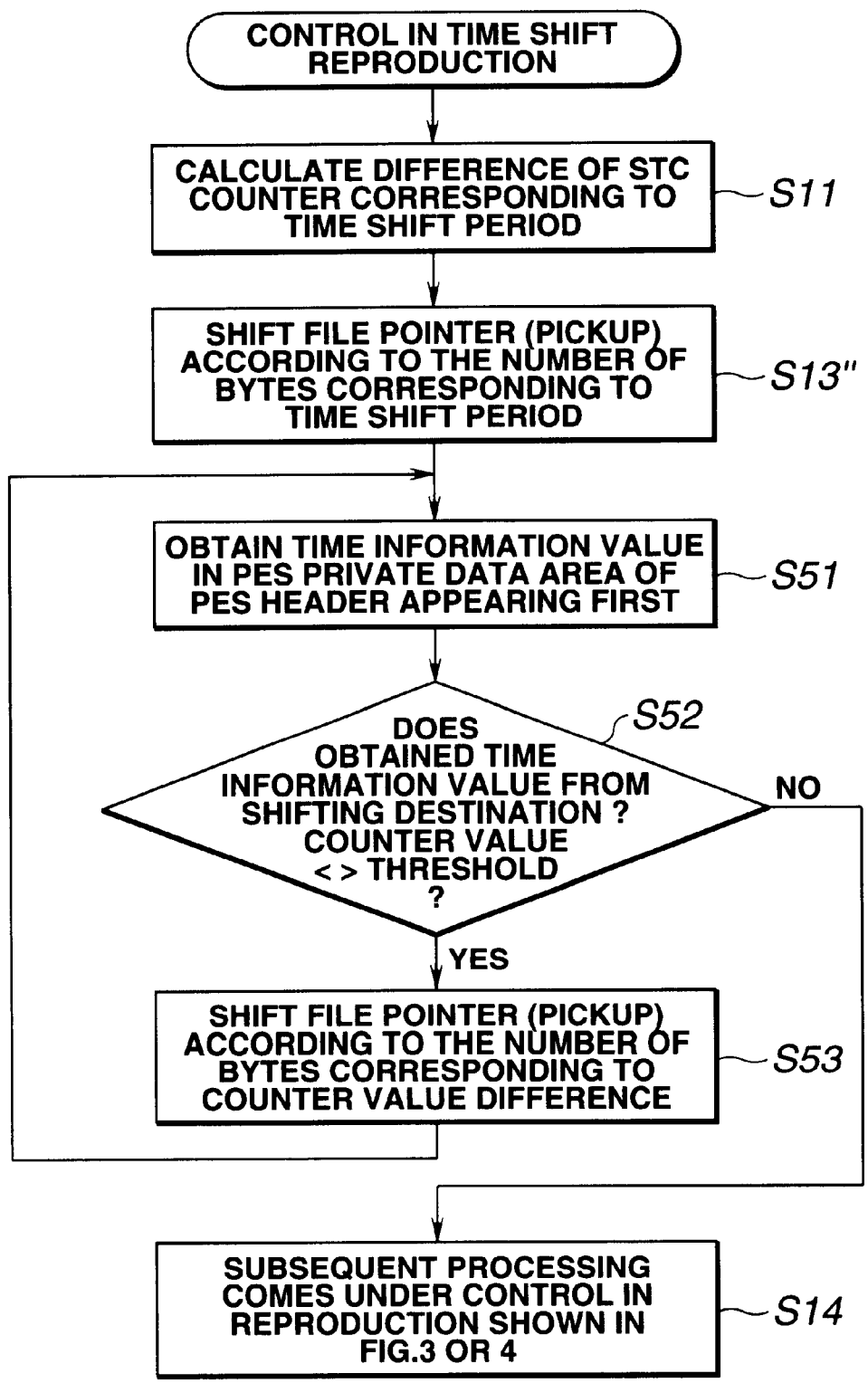
FIG. 19 is a flow chart for explaining an operation of the embodiment shown in FIG. 17.
Figure 20:
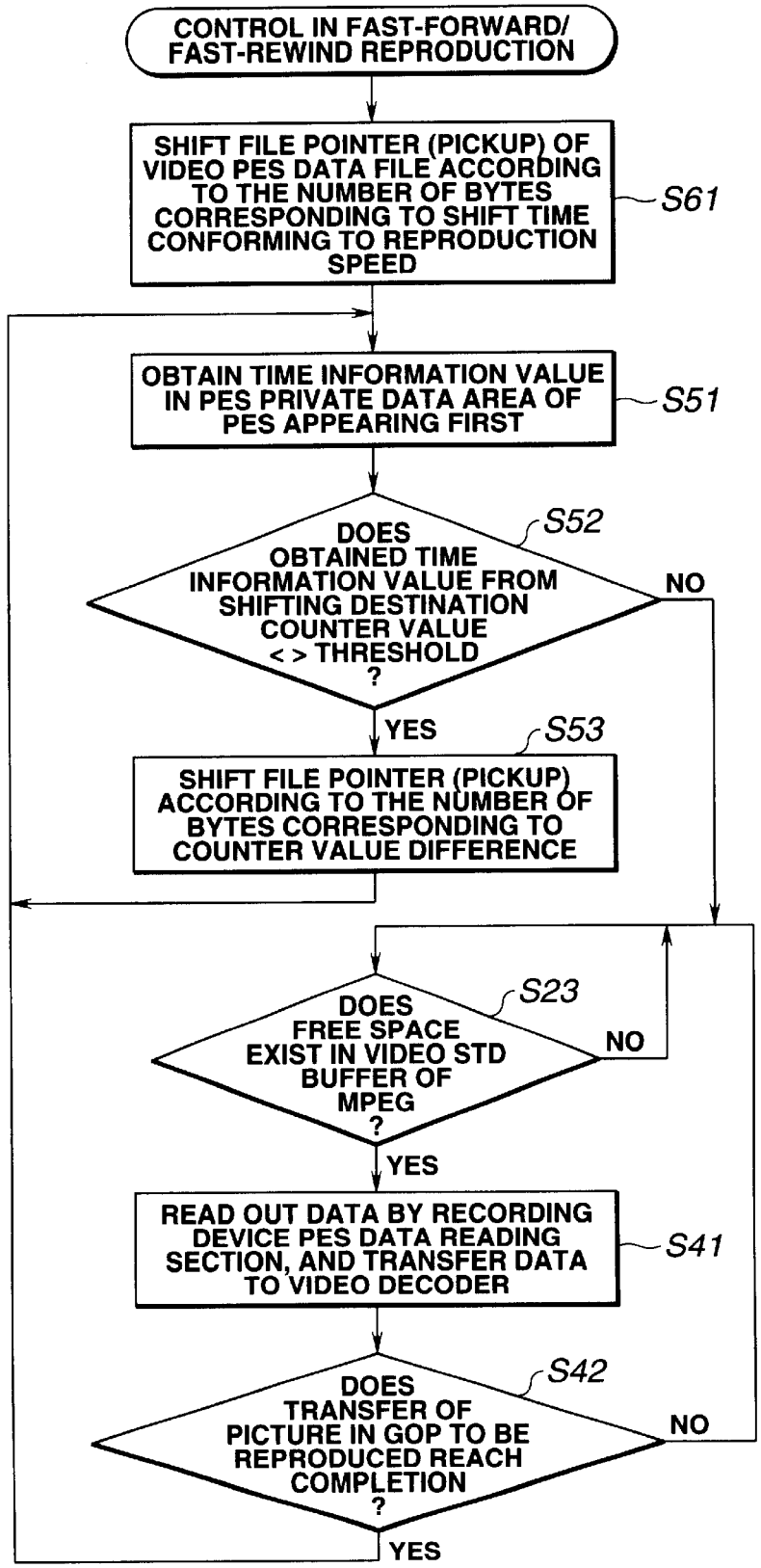
FIG. 20 is a flow chart for explaining an operation of the embodiment shown in FIG. 17.

Secondly, referring to the flow charts of FIGS. 18 to 20, a description will be given hereinbelow of an operation of the embodiment thus arranged. FIGS. 18 to 20 show the control in the recording. the time shift reproduction and the fast-forward/fast-rewind reproduction. In FIGS. 18 to 20, the same procedures as those in FIGS. 12, 14 and 15 are marked with the same numerals, and the description thereof will be omitted for simplicity.

Also in this embodiment, the processing of steps S1 and S2 in the recording are the same as those in the embodiment of FIG. 11. On the detection of the GOP head at the step S2, the operational flow advances to a step S3" to supply PES data to a recording device 61. In this case, a PCR value held in the demultiplexing/GOP head detecting section 22 is written in a PES private area of a PES header included in the output of the PES producing section 5 and then given to the recording device 61. In the case of no GOP head, the operational flow goes from the step S10 to a step S4" to supply the PES data to the recording device 61. The writing of the PCR value in the PES private area of the PES header is performed similarly.

Furthermore, in the case that the discontinuity indicator of a packet including the PCR shows 1 during the GOP period, or in the case that a PID to be demultiplexed by an operational signal such as a user channel switching signal is changed to become discontinuous, the PCR value at that time is additionally written in the PES private data area.

Incidentally, these information can be written in any one of the video PES stream file and the audio PES stream file. However, for realizing special reproduction such as a fast-forward/fast-rewind reproduction as will be described herein later, it is more appropriate to describe it in the video PES data.

Still further, a bit rate is calculated on the basis of the STC counter value and the data quantity in each GOP at every GOP to be inputted to the recording/reproduction control section 29.

In this way, this embodiment also allows the recording of the PES data from the head of GOP.

The operation in the reproduction is similar to the operational flow shown in FIG. 13.

Moreover, referring to FIG. 19, a description will be made hereinbelow of the time shift reproduction.

In this embodiment, in the processing of the step S11, the data quantity corresponding to the time shift period is calculated as a function of the PCR value in the PES private data area and the bit rate. Subsequently, at the step S13", the file pointer, if the recording device is a hard disk, or the pickup, if the recording device is an optical disk, is shifted according to the data quantity to start the readout of the file.

At a step S51, the recording device PES data reading section 46 provides a PCR value in the PES private data area of the PES header on the basis of the data read out. Then, the operational flow proceeds to a step S52 to decide whether or not the PCR value provided is a value corresponding to the shift time designated. That is, when the PCR value provided lies between the counter value of the STC counter 25 and a predetermined threshold, the recording/reproduction control section 29 shifts the processing to the step S14 to transfer the PES data to the video decoder 8 or the audio decoder 9.

If the difference between the PCR value read out and the STC value corresponding to the designated shift time is greater than a predetermined threshold, the recording/reproduction control section 29, at a step S53, alters the reading destination from the bit rate and that difference time and, at the step S13", starts the file readout.

Thereafter, with the repetition of the steps S51 to S53, if the difference between the PCR value in the PES private data and the STC value corresponding to the shift time becomes less than the threshold, the PES data is outputted to the video decoder 8 or the audio decoder 9. Thus, the time shift reproduction is realizable.

Referring to FIG. 20, a description will be made hereinbelow of the control in the fast-forward/fast-rewind reproduction. In FIG. 20, the same procedures as those in FIG. 19 are marked with the same numerals.

At a step S61, the recording/reproduction control section 29 calculates the data quantity, corresponding to the STC counter value interval depending upon the shift time interval, on the basis of the bit rate, and shifts the reading destination in the video bit stream file 42 by a quantity corresponding to the calculated data quantity before starting the readout. In this case, the readout of the audio data is put to a stop. The recording device PES data reading section 46, at the step S51, reads out a PCR value in the PES private data area of the PES header on the basis of the data read out.

If it corresponds to the shift time designated, the operational flow goes from the step S52 to the step S23. If the video STD buffer has a free space, the PES data read out in the step S41 is transferred to the video decoder 8 or the audio decoder 9.

On the other hand, if the difference between the PCR value read out and the STC value corresponding to the shift time is more than a predetermined threshold, the operational flow proceeds from the step S52 to the step S53 where the recording/reproduction control section 29 changes the reading destination on the basis of the bit rate and that difference time, then starting the file readout (step S61).

Likewise, owing to the repetition of the steps S61, S51 and S52, if the difference between the PCR value in the PES private data and the STC value corresponding to the shift time becomes less than the threshold, the operational flow goes to the step S23.

Figure 15:
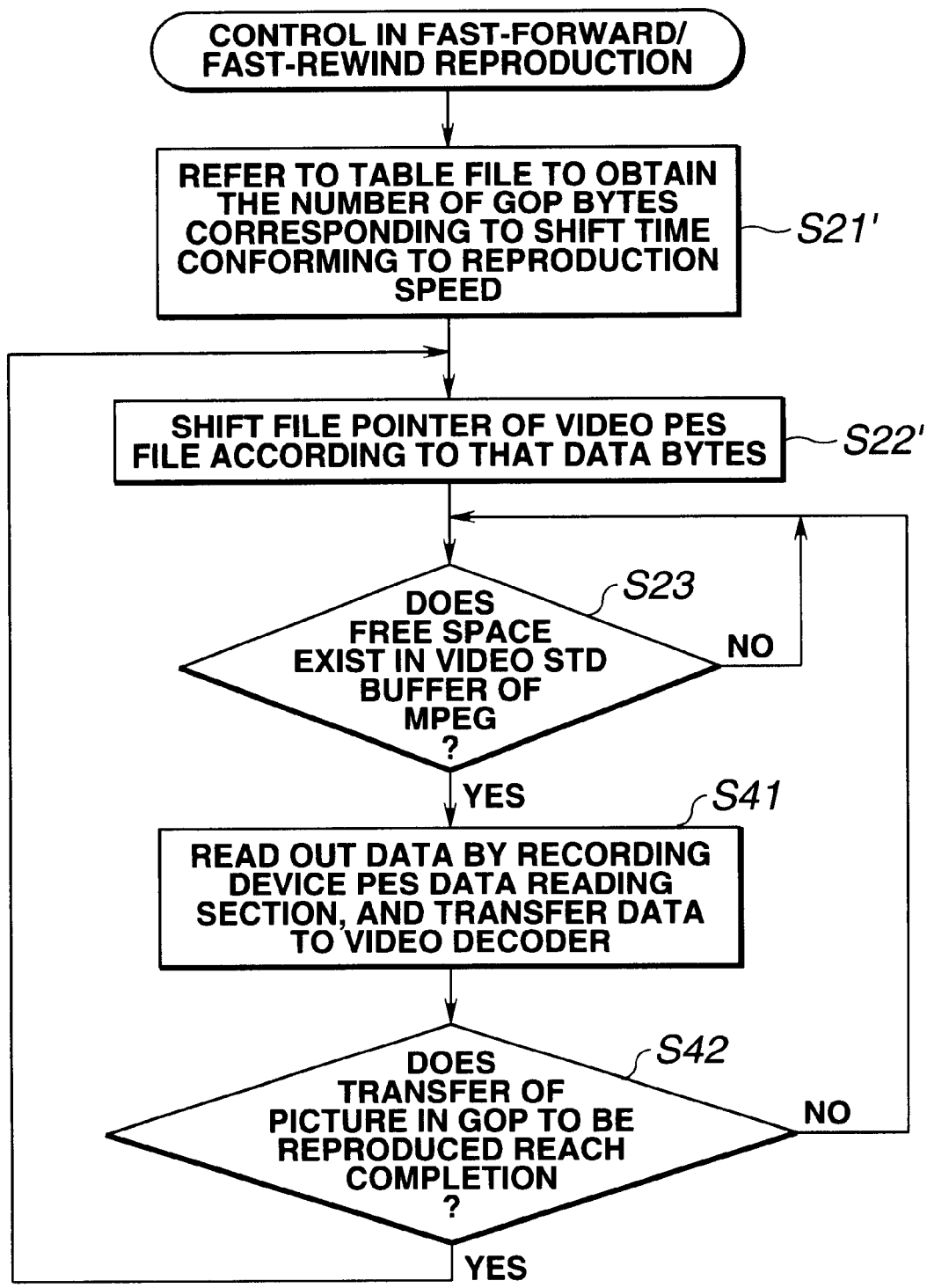
FIG. 15 is a flow chart for explaining an operation of the embodiment shown in FIG. 11.

The other operation is the same as that in FIG. 15. Thus, the fast-forward/fast-rewind reproduction is possible.

Figure 21:
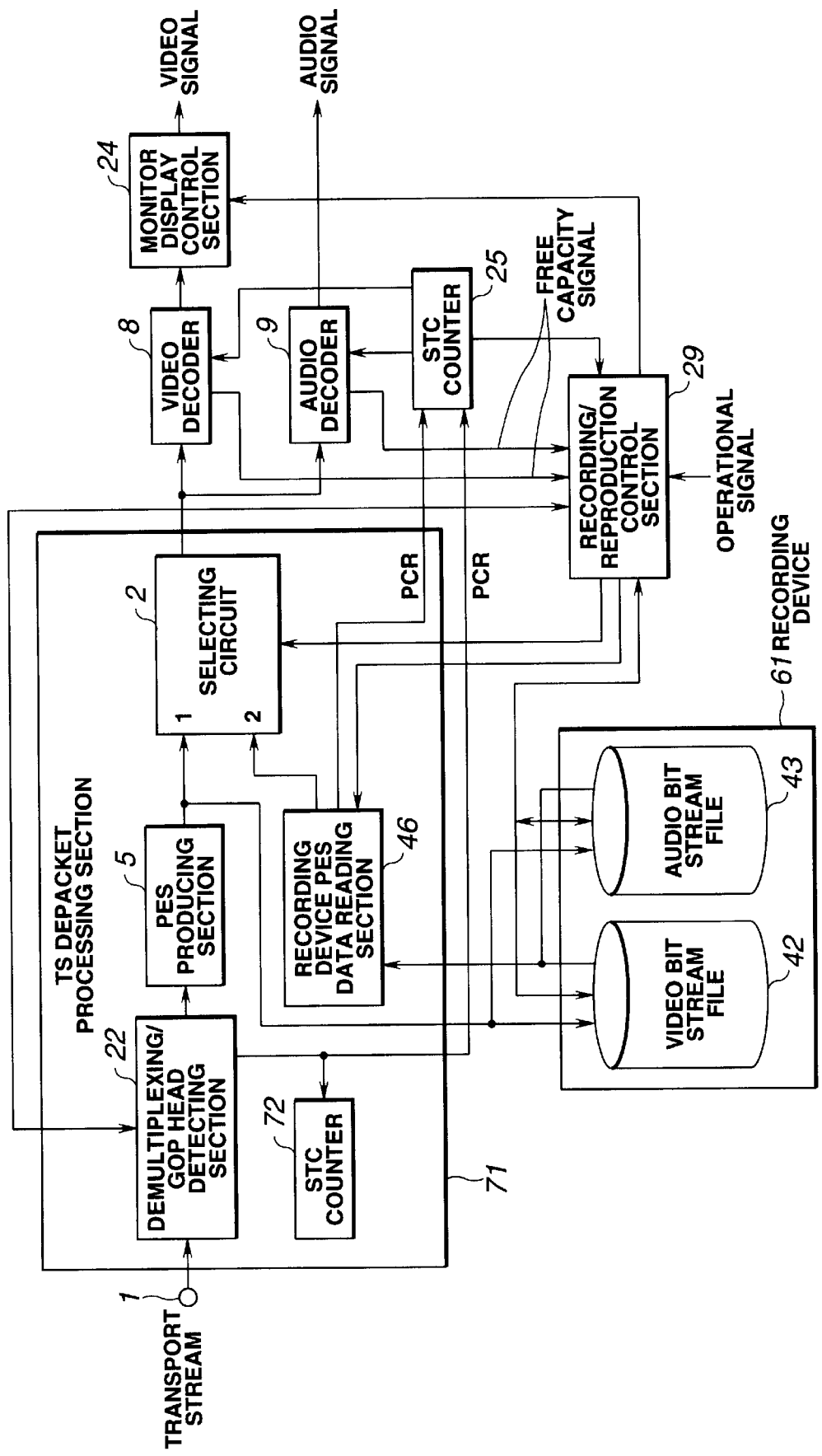
FIG. 21 is a block diagram showing a still further embodiment of this invention.

FIG. 21 is a block diagram showing a further embodiment of this invention. In FIG. 21, the same components as those in FIG. 17 are marked with the same numerals, and the description thereof will be omitted for brevity.

This embodiment differs from the embodiment shown in FIG. 17 in that a TS depacket processing section 71 includes a STC counter 72. The STC counter 72 receives a PCR value from the demultiplexing/GOP head detecting section 22, and counts this PCR value, thereby obtaining the STC.

In the embodiment thus arranged, the recording/reproduction control section 29 can write the count value of the STC counter 72 as the time information in the PES private data area. The other operation is similar to that in FIG. 17.

Accordingly, also in this case, as well as the embodiment of FIG. 17, there is no need to maintain the PCR value in the demultiplexing/GOP detecting section 22.

This embodiment can also offer the effects similar to those of the embodiment shown in FIG. 17.

Besides, although in the description of the embodiments shown in FIGS. 17 and 21 the time information is described in the PES private data area, it is also appropriate to describe it in an area other than the PES private data.

Meanwhile, in the description of the above-described embodiments, the PCR approximately coincides with the GOP head timing. However, in fact, the PCR and the GOP head timing can be shifted slightly from each other, which can hinder the sure access.

Figure 22:
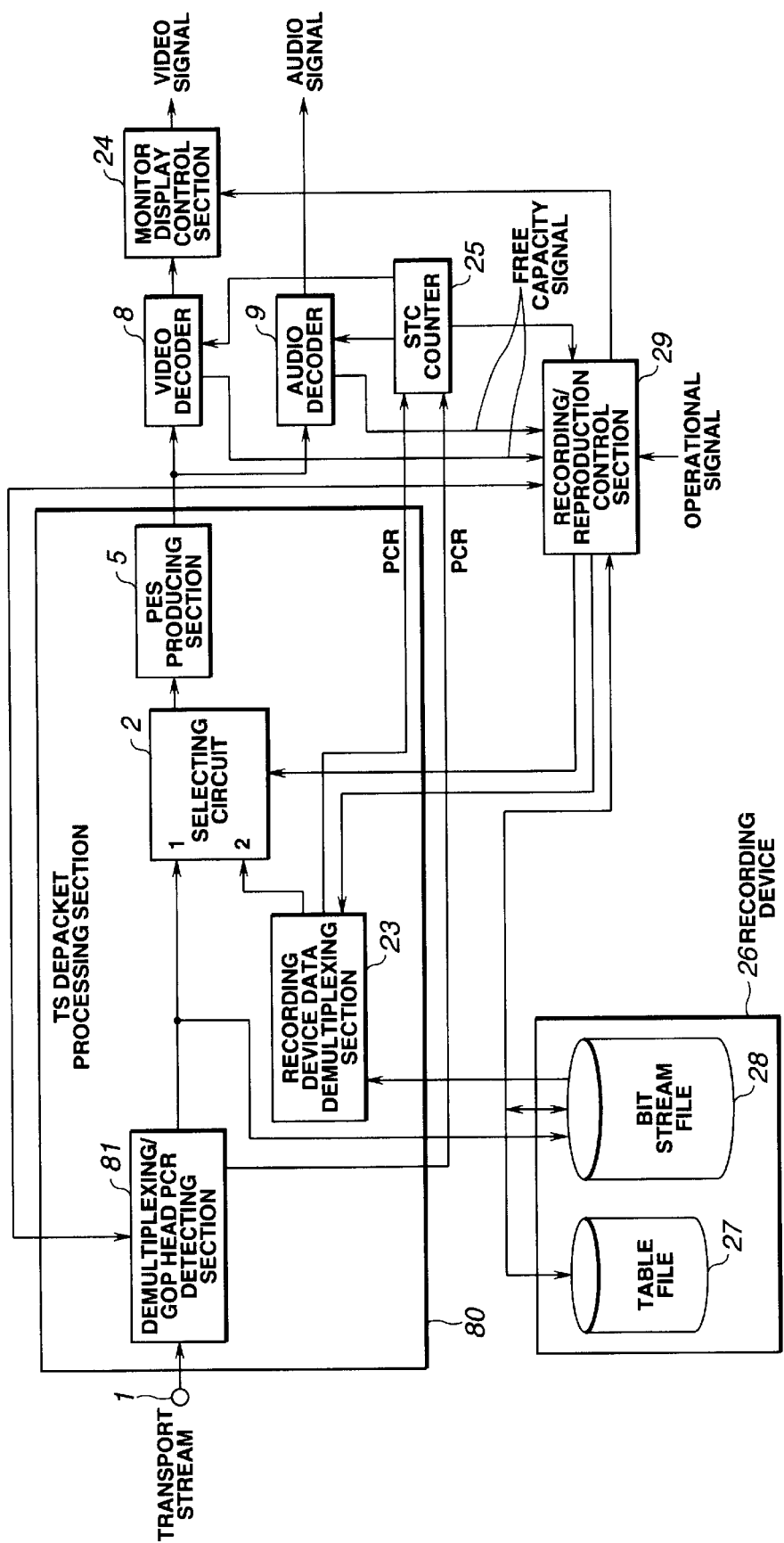
FIG. 22 is a block diagram showing a still further embodiment of this invention.

Thus, in consideration of this difference between the GOP head timing and PCR timing, an approach may be taken for accomplishing the accurate access. FIG. 22 is a block diagram showing an embodiment coping with this case. In FIG. 22, the same components as those in FIG. 2 are marked with the same numerals, and the description thereof will be omitted for brevity.

This embodiment differs from the embodiment shown in FIG. 2 in that a TS depacket processing section 80 includes a demultiplexing/GOP head PCR detecting section 81. The demultiplexing/GOP head PCR detecting section 81 is made to detect the PCR immediately before the GOP head. That is, whenever obtaining the PCR value, the demultiplexing/GOP head PCR detecting section 81 keeps the latest value and the number of packets recorded, in an internal variable.

The recording/reproduction control section 29 records the PCR value immediately before the GOP head in a table file, and records the number of packets between two PCR values detected immediately before the successive GOP heads.

Figure 23:
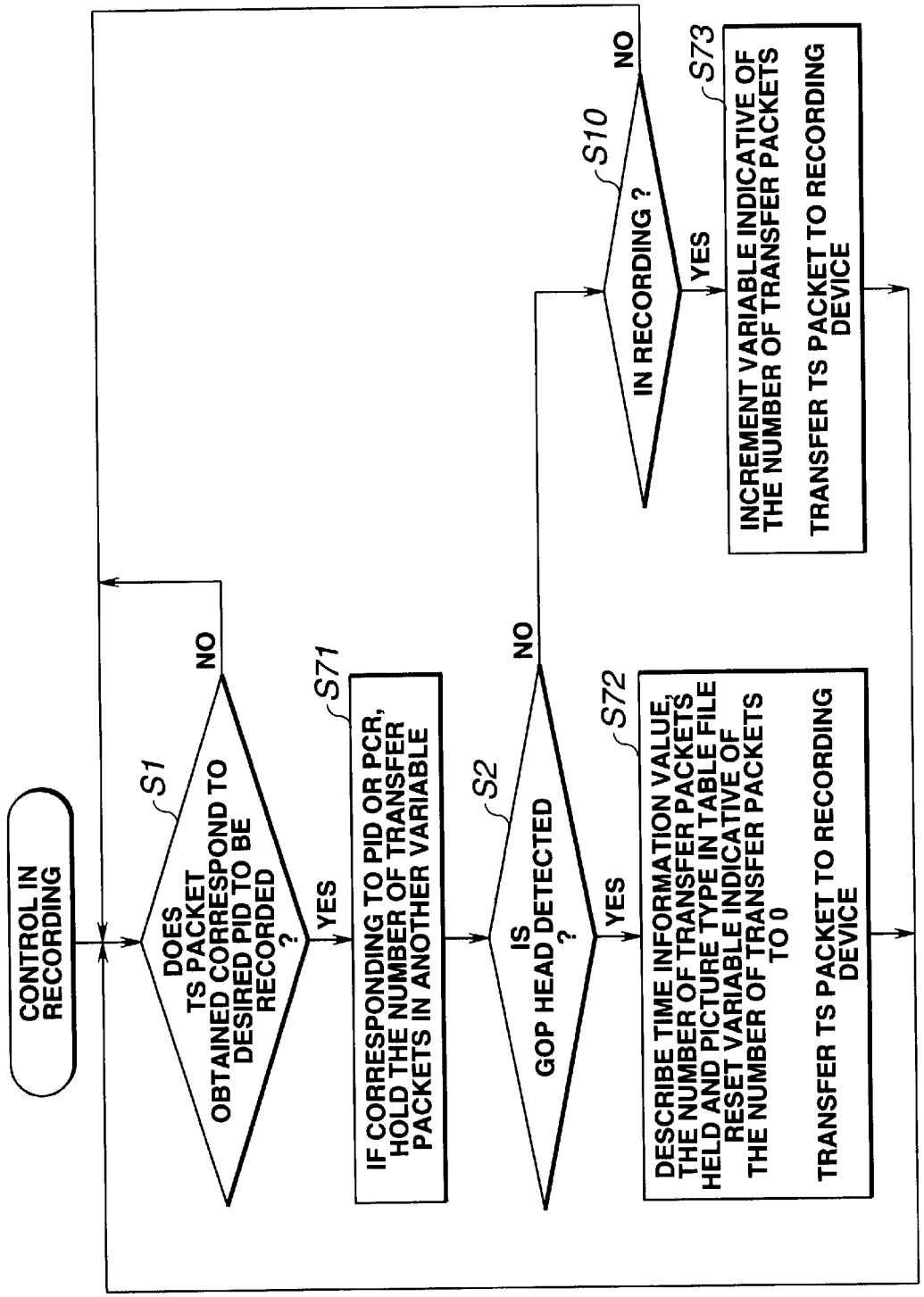
FIG. 23 is a flow chart for explaining an operation of the embodiment shown in FIG. 22.

Referring to FIG. 23, a description will be made hereinbelow of an operation of the embodiment thus arranged. FIG. 23 is a flow chart showing the control in the recording, corresponding to FIG. 3.

A difference of the control in the recording from that in the embodiment shown in FIG. 2 is that, as shown at a step S71 in FIG. 23, in a demultiplexing/GOP head PCR detecting section 81, when the PID of an inputted stream coincides with the PID of the PCR, the number of transfer packets is kept in another variable.

That is, the demultiplexing/GOP head PCR detecting section 81, when the inputted packet coincides with the PID of the PCR, loads that PCR value in the STC counter 25 to set the count value, and, whenever the PCR packet is depacket-processed to obtain the PCR value, maintains the latest value and the number of packets recorded, in an internal variable.

In the middle of GOP, at a step S73, the number of transfer packets is incremented. On the detection of the GOP head at a step S2, at a step S72 the PCR value immediately before the GOP head is described as the time information value in the table file. Furthermore, the number of transfer packets up to the PCR immediately before the GOP head is described in the table file, while a variable representative of the number of transfer packets is reset to 0.

In this way, the information on the number of transfer packets between the PCR value immediately before the GOP head and the PCR value immediately before the GOP head adjacent thereto is stored in the table file.

The control in the reproduction, the time shift reproduction, the fast-forward/fast-rewind reproduction and others are the same as those of the embodiment in FIG. 2.

In this embodiment, the PCR value immediately before the GOP head is used as the time information, and the number of packets between the PCRs immediately before the successive GOPs is used as the number of transfer packets, whereupon the reproduction can surely be made from the GOP head. The other effects are similar to those of the embodiment shown in FIG. 2.

Figure 24:
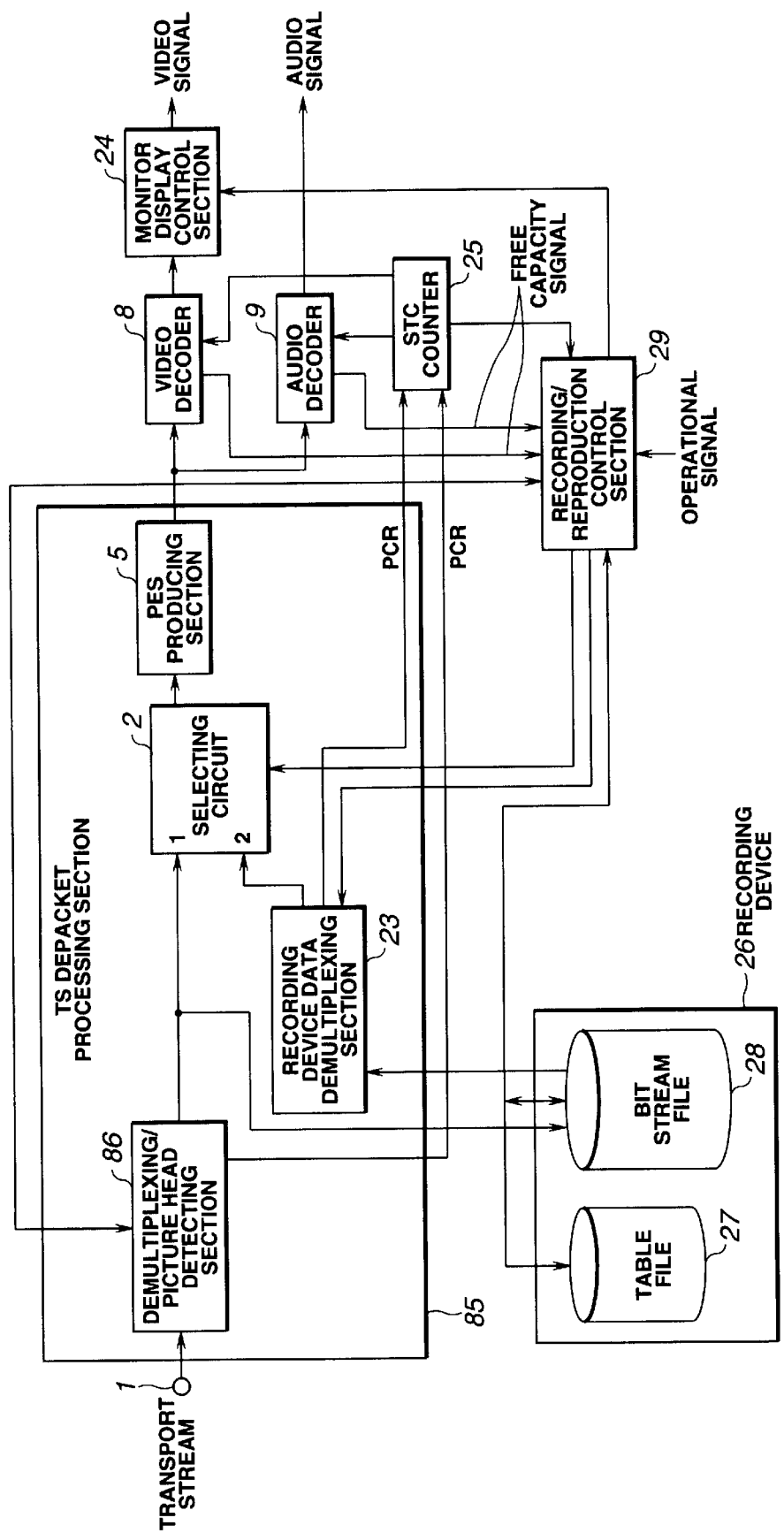
FIG. 24 is a block diagram showing a still further embodiment of this invention.

FIG. 24 is a block diagram showing a further embodiment of this invention. In FIG. 24, the same components as those in FIG. 2 are marked with the same numerals, and the description thereof will be omitted for simplicity. In the special reproduction shown in FIG. 9, for example, only the I picture is reproduced, and in the embodiment shown in FIG. 2 the I picture is selectively reproduced on only the reproduction side. On the contrary, in this embodiment, in the recording the information is recorded at every picture so that the special reproduction or the like is easily achievable.

This embodiment differs from the embodiment shown in FIG. 2 in that a TS depacket processing section 85 is provided with a demultiplexing/picture head detecting section 86.

The TS depacket processing section 85 detects the number of transfer packets, a picture type and time information at every picture. The recording/reproduction control section 29 records these information in the table file 27.

Figure 25:
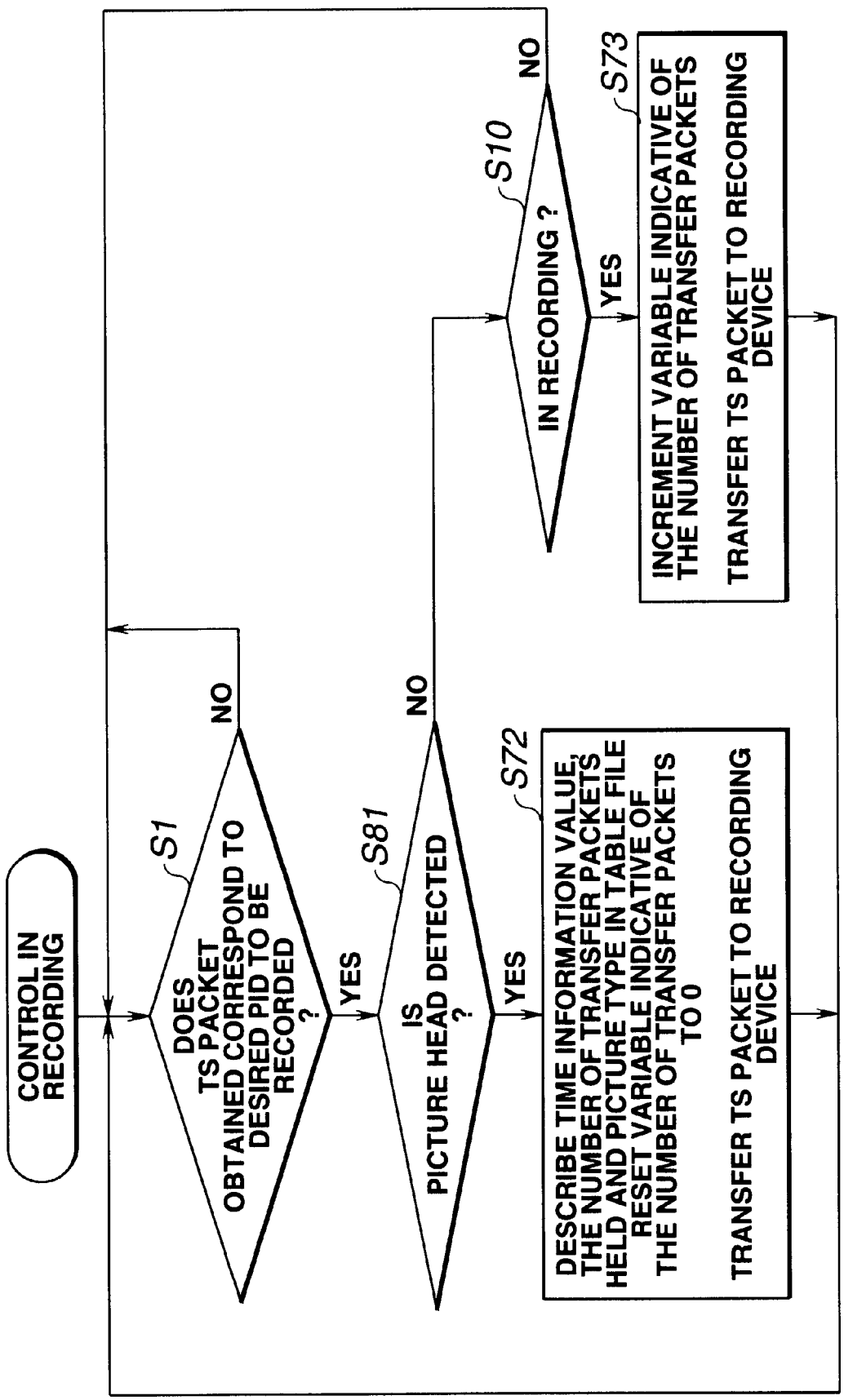
FIGS. 25 and 26 are flow charts for explaining an operation of the embodiment shown in FIG. 24.
Figure 26:
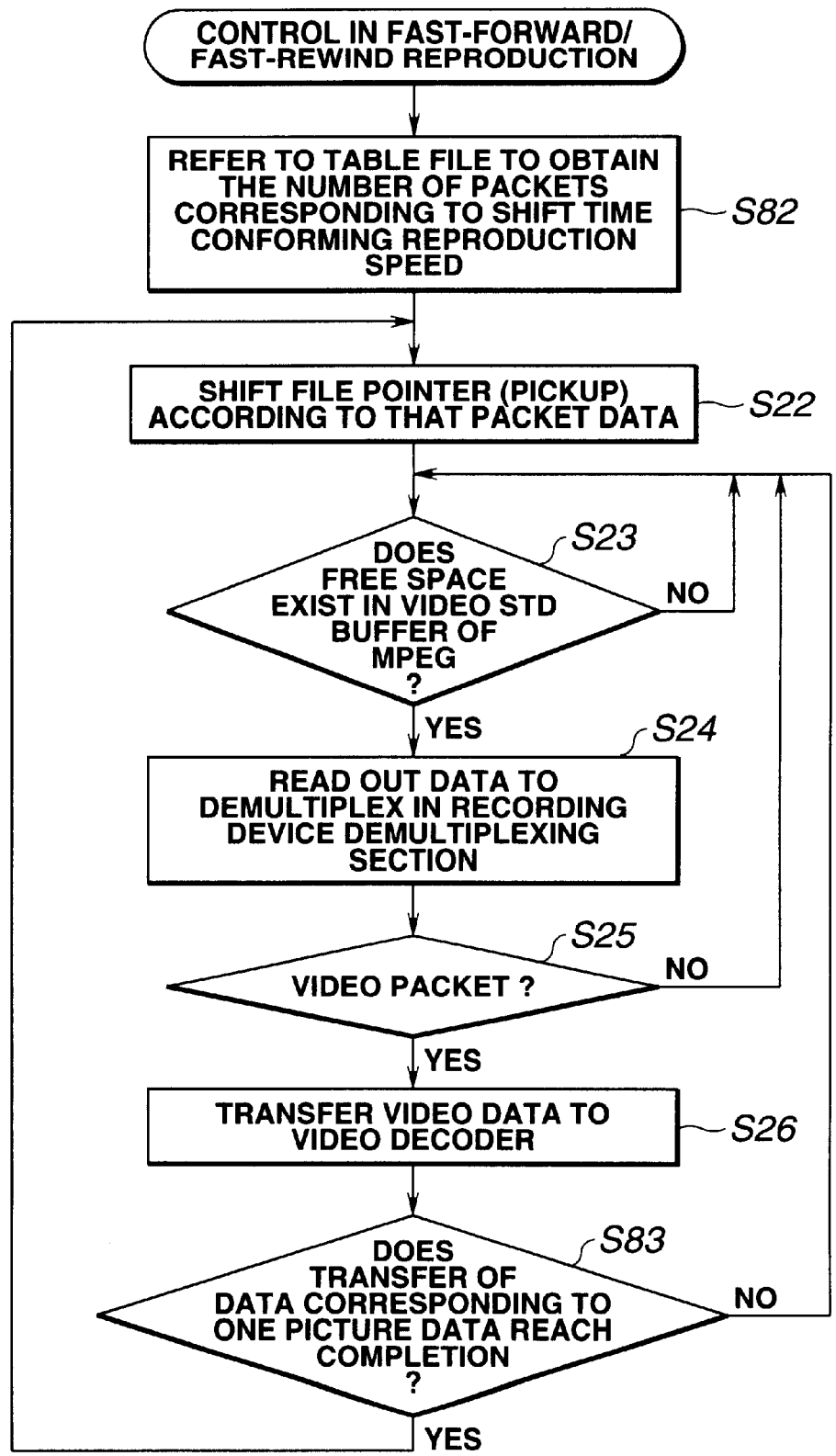

Secondly, referring to the flow charts of FIGS. 25 and 26, a description will be made hereinbelow of an operation of the embodiment thus arranged. FIGS. 25 and 26 correspond to FIGS. 3 and 9, respectively.

In this embodiment, the control in the reproduction is similar to that in the embodiment shown in FIG. 2. In the recording, as shown in FIG. 25, at a step S1, a check is made on whether or not a TS packet the demultiplexing/picture head detecting section 86 gets coincides with the desired PIDs of an image, a voice, a PCR and others. On the coincidence with the PID, the demultiplexing/picture head detecting section 86 transfers the TS packet, and increments a counter variable indicative of the number of transfer packets whenever transferring it (step S73).

Furthermore, at a step S81, the head of a picture is detected and the counter variable is kept in another internal variable at every detection. Besides, it is possible to find the picture head by detecting a picture header included in a video signal. In addition, it is also possible to use a payload_unit_start_indicator included in the TS header for the picture head detection. Incidentally, this payload_unit_start_indicator is a flag which assumes "1" when the PES header of a video signal exists at the head of the payload of that TS packet. For example, in a bit stream in which the PES header is given to each picture, this flag indicates the head of the picture. Accordingly, the detection of the payload_unit_start_indicator permits the detection of the picture head.

At a step S72, the time information on the picture head and the number of transfer packets for each picture are recorded in the table file 27.

Furthermore, a description will be made hereinbelow of an operation in the time shift reproduction. In the time shift reproduction, this embodiment is similar to the embodiment shown in FIG. 2 in that the table file 27 is referred to shift the reading destination according to the data quantity corresponding to a desired time difference so that the reproduction begins at the shifted point. In this embodiment, since the information included in the table file 27 forms the transfer data quantity for each picture and the time information, the reproduction is made to start by referring to the picture type recorded additionally.

That is, for example, because as the GOP head the picture type becomes the head of the I picture, the I picture that the shifting destination time is the closest may be searched in the table file 27. Furthermore, the reading destination is shifted according to the transfer data quantity corresponding to that time difference and the reproduction starts, thereby realizing the time shift reproduction.

Still furthermore, if the reproduction begins at the head of the I picture at this time, when the PCR does not exist at the head of the I picture, difficulty is experienced to establish the time measurement in the receiver, which makes it difficult to display the picture. Accordingly, it is considered that the readout does not start at the head of the I picture but taking place from the picture previous immediately to that I picture. In this way, the establishment of the time measurement in the receiver becomes feasible when the head of the I picture is decoded, so that it is possible to display the decoded image of that picture.

Referring to FIG. 26, a description will be made hereinbelow of the control in a special reproduction such as fast-forward/fast-rewind.

This control is similar to that of the embodiment shown in FIG. 2 in that the recording/reproduction control section 29 checks a buffer free capacity signal to see if the buffer has a free space or capacity and, if confirming the presence of the free space, makes the recording device data demultiplexing section 23 conduct depacket-processing for decoding.

In this case, the recording/reproduction control section 29 refers to the table file 27 and transfers only one picture. Since the transfer data quantity for each picture is described in the table file 27, it is possible that, at a step S82, the number of packets corresponding to the shift time is obtained and, at a step S83, the transfer data corresponding to only one picture is read out.

In this way, as well as the embodiment shown in FIG. 2, it is possible to eliminate the need to detect the completion of picture decoding in the reproduction, which offers an advantage in that there is no need to read out extra data. With the repetition of the above-described operation, the fast-forward/fast-rewind reproduction becomes possible.

Figure 27:
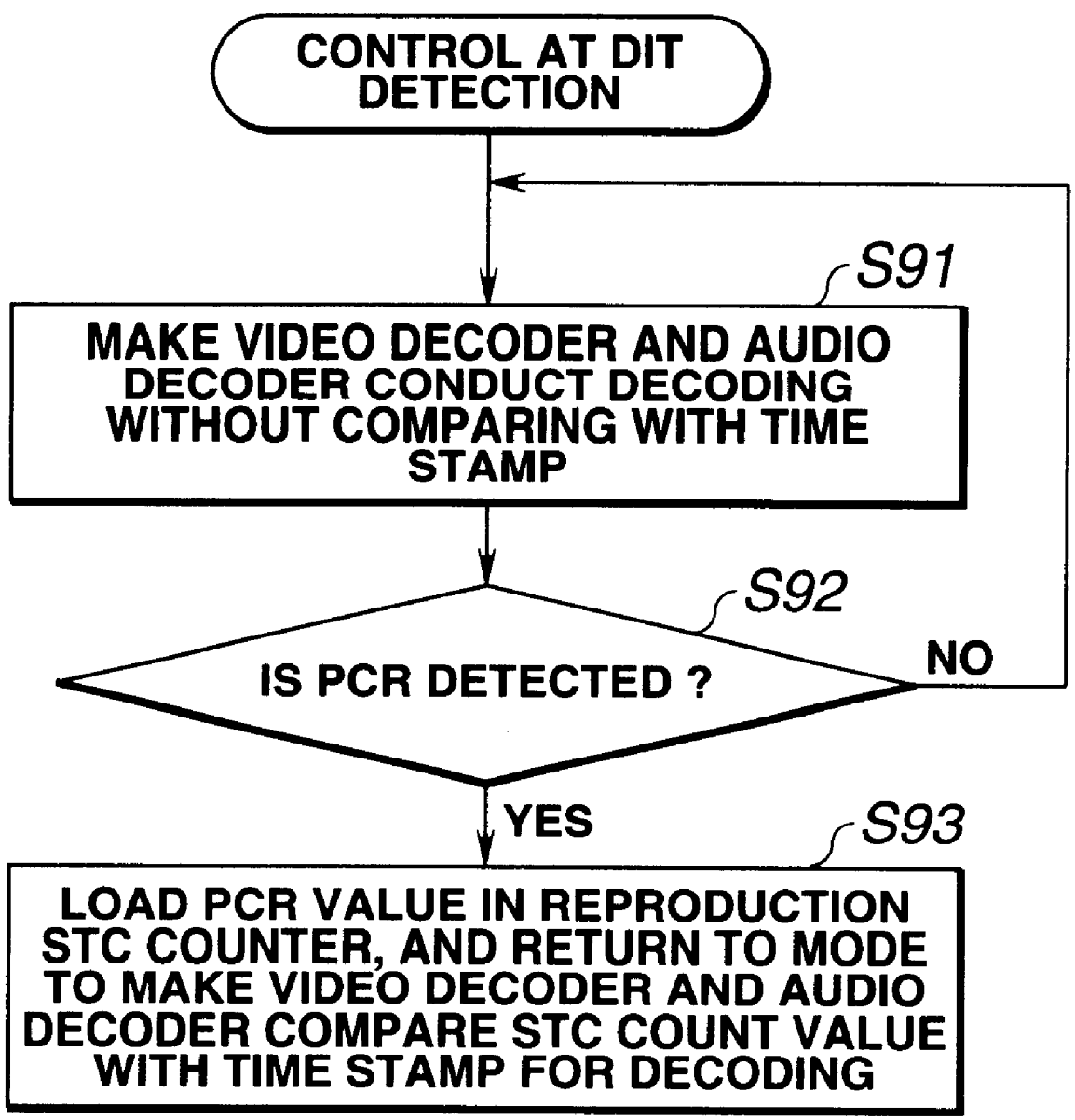
FIG. 27 a flow chart for describing a still further embodiment of this invention.

FIG. 27 is a flow chart showing a still further embodiment of this invention. The embodiment of FIG. 27 relates to an decoding operation to be conducted when a DIT packet indicative of a discontinuous point of a recorded bit stream is detected in reproducing the bit stream.

According to the MPEG standard, for example, when a stream becomes discontinuous due to a stop of recording by an operation of a receiver or the like, a DIT packet is made to be inserted into the discontinuous point.

When detecting a DIT packet, the recording device data demultiplexing section informs the recording/reproduction control section that the bit stream becomes discontinuous. Thus, the recording/reproduction control section gives an instruction to the video decoder and the audio decoder for performing the decoding without comparing the counter value of the reproduction STC counter with the time stamp of the bit stream.

Furthermore, when the recording device data demultiplexing section detects the next PCR, the recording/reproduction control section loads that value in the reproduction STC counter, thereby returning to the ordinary decoding condition.

With such a reproducing operation, the continuous decoding of the bit stream where the DIT exists becomes feasible.

FIGS. 28A to 28D are explanatory illustrations of a still further embodiment of this invention.

In the above-described embodiments, in the case of performing a speed-increasing reproduction such as the fast-forward reproduction, there is a need to gain access to the I picture with high efficiency. For the high-efficiency access to the I picture at the N-times speed reproduction, there have been employed various access means, for example, disclosed in Japanese Unexamined Patent Publication Nos. 10-257439 and 8-273296.

According to the access means disclosed in Japanese Unexamined Patent Publication No. 10-257439, on the assumption of dealing with data in which a frame size of video data compressed and encoded is fixed, dummy data is added to make a multiple of a unit of access and is recorded on a hard disk so that the position, on the hard disk, of a frame to be accessed at the N-times speed reproduction can be specified through simple calculation.

According to the access means disclosed in Japanese Unexamined patent Publication No. 8-273296, an ID (Identifier) is given to each of frames of compressed and encoded video data to establish the corresponding relationship between the ID and the recorded position of the frame on a record medium so that the position, on the record medium, of the frame to be accessed at a special reproduction can easily be specified.

However, the first-mentioned access means is not applicable at all in the case that the frame size of the video data compressed and encoded does not assume a fixed length, and the second-mentioned access means requires newly drawing up a table showing the correspondence between the frame IDs and the frame recorded positions.

This embodiment permits the high-efficiency access to specific video data in N-times speed reproduction of a disk retaining compressed and encoded video data.

Although a description of this embodiment will be made in the case that a hard disk is used as the record medium, this embodiment is also applicable to an optical disk and others.

FIG. 28A is an illustration of video data to be recorded on a hard disk through a hard disk drive HDD. This video data is compressed and encoded according to the MPEG standard, and after one I picture, one P (Predictive) picture and four B (Hdirectionally predictive) pictures are arranged in a predetermined sequence, with six pictures constituting one GOP.

This video data is divided in units of 255 bytes and a 1-byte index is added to each of the heads of the divisions so that 256 bytes organize a unit, with these data being successively recorded in sectors of the hard disk in units of 256 bytes. successive sector numbers are given to these sectors so that they serve as addresses to be used in gaining access to the video data on the hard disk. That is, the sector forms an access unit of the video data. Furthermore, in the example of FIG. 28A, the video data corresponding to six pictures are recorded in eight sectors.

When this video data is recorded on the hard disk, "ff (hexadecimal)" is recorded as an index in each of the sectors until the I picture is detected, while "00" is recorded as an index in the sector at which the I picture starts, and the values successively incremented are recorded as indexes in the following sectors until the next I picture is detected.

Besides, if the increment causes the index to become "FF", "ff" is recorded as the indexes in the following sectors until the next I picture is detected.

That is, the index "ff" signifies that, when viewed from the corresponding sector, a sector at which the I picture starts exists prior by more than 255 sectors thereto or that the I picture does not exist before the corresponding sector.

With the above-mentioned index recording operation, in the example of FIG. 28A, "ff" is recorded as the index in the sectors up to the sector of the sector number 1, while "00" is recorded as the index in the sector of the sector number 2, and the values incremented successively are recorded as indexes in the following sectors having the sector numbers 3 to 9, respectively, and further "00" is again recorded as the index in the sector of the sector number 10.

Referring to FIG. 28B, a description will be made hereinbelow of six-times speed reproduction of a hard disk on which video data is recorded as mentioned above. As described above, since the data rate of the video data on the hard disk is 6 pictures/8 sectors, in the case of the six-times speed reproduction, the I picture can be searched in units of 8 sectors. That is, the I picture start position is detected at every 8 sectors and the reproduction of that video data is performed repeatedly.

First, the data in the sector of the sector number 0 is read out from the hard disk and its index value is detected. In this case, judging from that the index is "ff" and the present sector is the initial sector, it is seen that an I picture does not exist before this sector.

Following this, the data in the sector of the sector number 8 appearing 8 sectors after is read out therefrom and its index value is detected. In this case, since the index is "06", the data is read out from the sector having, as the sector number, a value "2" obtained by subtracting the index value "06" from the sector number 8, so that the video data corresponding to one picture is read out and reproduced.

In this way, at the end position of the I picture, that is, on the completion of the data readout from the sector of the sector number 4, the data is read out from the aforesaid sector of the sector number 8, and further from the sector of the sector number 16 appearing 8 sectors after, and its index value is detected. In this case, since the index value is "06", the data is read out from the sector having, as the sector number, a value "10" obtained by subtracting the index value "06", from the present sector number 16, so that the video data for the next I picture is read out and reproduced. Furthermore, the aforesaid operation is repeatedly conducted for the sectors having the sector numbers 24, 32, 40, . . . , thereby accomplishing the six-times speed reproduction.

On the other hand, in the case of the three-times speed reproduction of the aforesaid hard disk, as shown in FIG. 28C, an operation is repeatedly conducted such that the numbers of the sectors at which the I picture starts are successively calculated on the basis of the indexes of the sectors of the sector numbers 0, 4, 8, 12, . . . and the video data of the I picture is reproduced.

However, in the case that the multiplier (reproduction speed increasing degree) is low so that the same I picture is continuously reproduced (in the example of FIG. 28C, each of the sectors of the sector numbers 2, 3 and 4 is reproduced twice.), an instruction is given to the control system (display system) to display the same image as the previous one, thereby reducing the wasteful access operation.

According to the above-described embodiment, when compressed and encoded video data is recorded on a hard disk, an index is recorded in each of the sectors so that the number of the sector at which an I picture starts can be calculated from the corresponding sector, and at the N-times speed reproduction of the hard disk, the number of the sector at which the I picture starts is calculated on the basis of the corresponding index at every sector to be jumping-reproduced at a predetermined interval corresponding to that multiplier (N) and the I picture video data is reproduced, thereby gaining access to only the I picture effectively with almost no readout of wasteful data, so that this embodiment is sufficiently practicable.

Besides, in the case that an index is not recorded in each sector, as shown in FIG. 28D, all the data is read out in order from the initial sector, and only the video data of the I picture is reproduced, or the I picture is solely retrieved in the sector to be jumping-reproduced at a predetermined interval corresponding to the multiplier, which leads to a low efficiency.

Figure 29A:
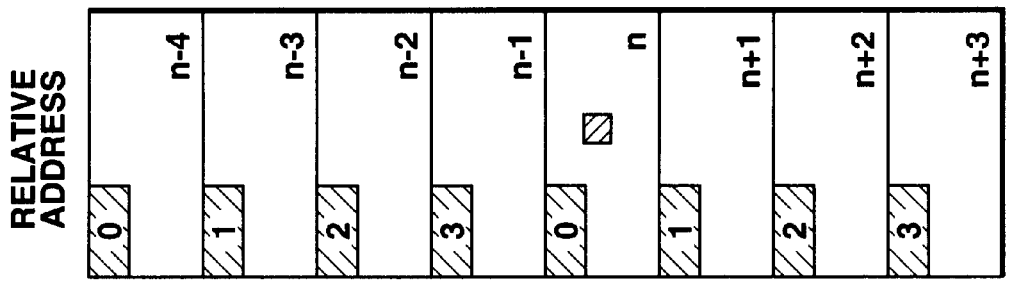
FIGS. 29A to 29C are illustrations for describing a still further embodiment of this invention.
Figure 29B:
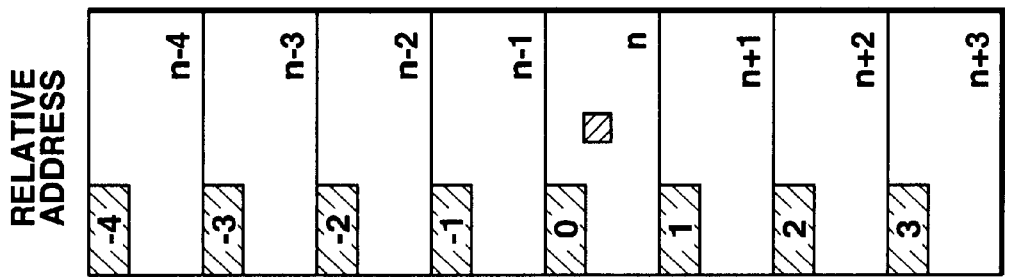
Figure 29C:
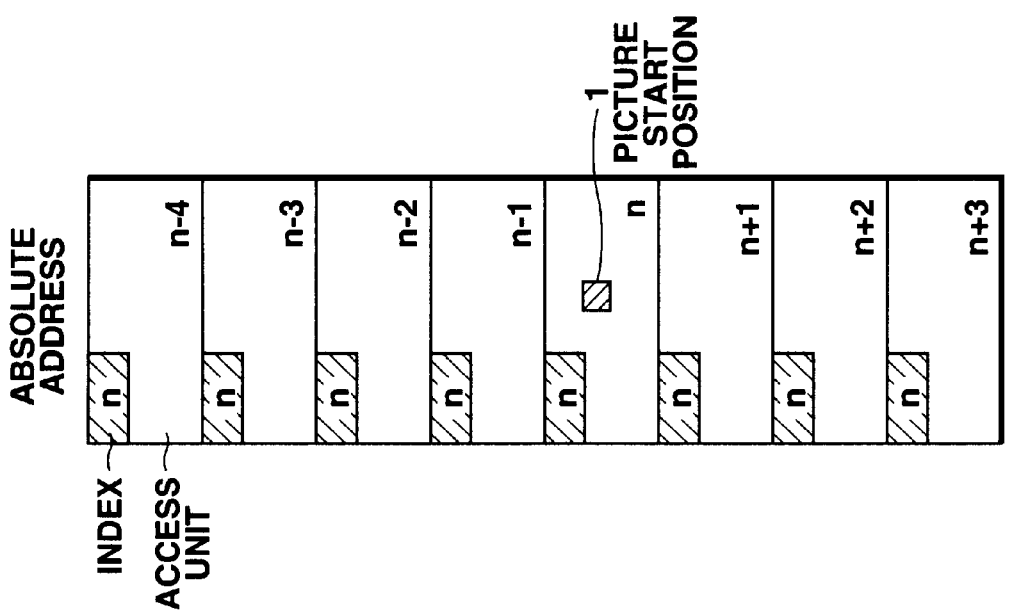

FIGS. 29A to 29C are explanatory illustrations of a still further embodiment of this invention.

In FIG. 29A, compressed and encoded video data is divided in units of access each having a constant data quantity, and is recorded in a disc-like record medium. Furthermore, an absolute address n of the access unit, including the start position of the I picture, is recorded as an index in the head of each of the access units.

Thus, since the absolute address n of the access unit, including the start position of the I picture, is recorded as the index to be given to each access unit, in a manner that the index is read out from the access unit accessed randomly, the I picture close to that access unit can quickly be reproduced while suppressing wasteful readout to a minimum.

Furthermore, in FIG. 29B, a relative address indicative of the position of the access unit including the I picture start position from its own access unit (that is, indicating how many access units lies therebetween) is recorded as an index in the head of each of the access units. In this case, the negative (minus) or positive (plus) sign of the relative address indicate that the access unit including the I picture start position exists after or before that access unit in the absolute address order.

As described above, since the relative address of the access unit, including the start position of the I picture, is recorded as the index to be given to each access unit, by reading out the index from the access unit accessed randomly, the I picture close to that access unit can quickly be reproduced while suppressing wasteful readout to a minimum.

Still furthermore, in FIG. 29C, a relative address indicative of the position of the access unit including the I picture start position from its own access unit (that is, indicating how many access units lies therebetween) is recorded as an index in the head of each of the access units. In this case, the relative address indicates only the access unit including the I picture start position, existing before its access unit in the absolute address order, which is substantially identical to the example described with reference to FIG. 28A.

Thus, since the relative address of the access unit, including the start position of the I picture, is recorded as the index to be given to each access unit, by reading out the index from the access unit accessed randomly, the I picture close to that access unit can quickly be reproduced while suppressing wasteful readout to a minimum.

In addition, since the relative address indicates only the access unit including the I picture start position, existing before a given access unit in the absolute address order, it is possible to easily produce the index in recording. That is, one counter is prepared and it is cleared to 0 when the access unit including the I picture start position is detected, and subsequently, is incremented whenever the data writing shifts to the next access unit, thereby producing the index.

FIGS. 30A to 30D are explanatory illustrations of a still further embodiment of this invention.

Figure 30D:
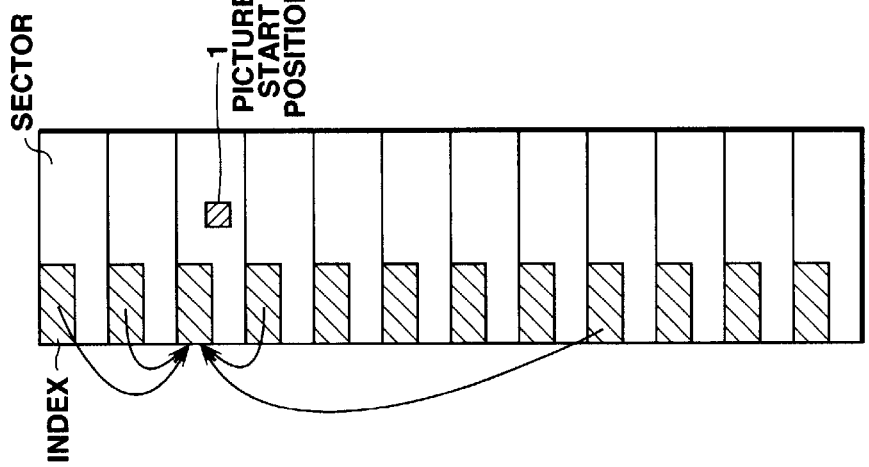
FIGS. 30A to 30D are illustrations for describing a still further embodiment of this invention.
Figure 30C:
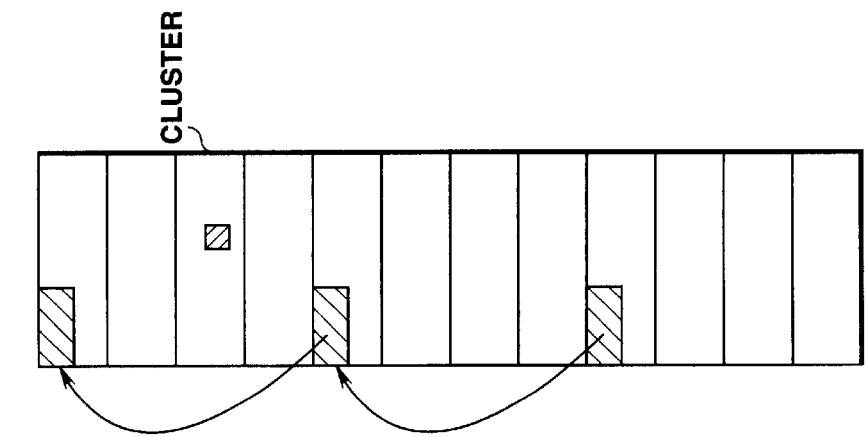
Figure 30B:
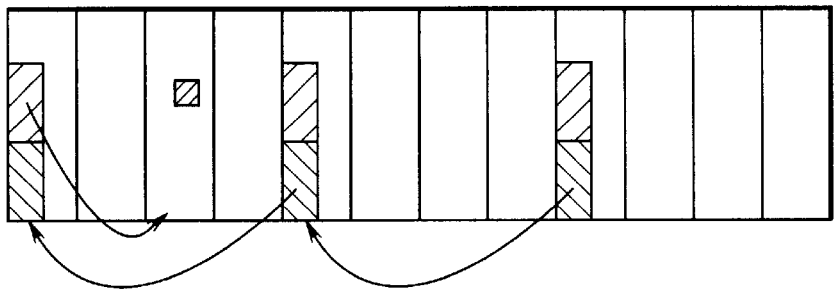
Figure 30A:
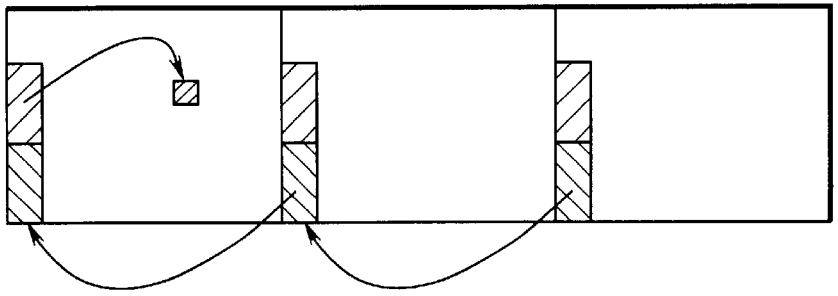

In FIG. 30A, on a hard disk, compressed and encoded video data is divided into sector units each forming a physical access unit in access to data, and is recorded in this state. In addition, a sector start address including an I picture start position is recorded as an index in the head of each of the sectors.

This operates effectively in the case of retrieving a sector including the I picture start position in a system of managing data, recorded on the hard disk, in units of physical access.

Furthermore, as shown in FIG. 30B, on the hard disk, a plurality of (in this illustration, 4) successive sectors are collected as a cluster unit forming a logical access unit in access to data. Further, an address for leading to a cluster including the I picture start position is recorded as an index in the head of a leading sector constituting each cluster. This is effective in the case of retrieving a cluster including the I picture start position in a system of managing data, recorded on a hard disk, in units of logical access.

Still furthermore, as shown in FIG. 30C, a first index indicative of an address for leading to a cluster including the I picture start position and a second index indicative of a sector start address including the I picture start position within that cluster can be recorded in the head of a leading sector constituting each cluster.

Moreover, as shown in FIG. 30D, a first index indicative of an address for leading to a cluster including the I picture start position and a second index indicative of a byte start address including the I picture start position within that cluster can be recorded in the head of a leading sector constituting each cluster.

Although in the above-described embodiments the information representative of the start position of the I picture is recorded as an index, this invention is not limited to this, but it is also appropriate to use, for example, information representative of the start position of a sequence header. In this case, since the reproduction is conducted from the sequence header at the random access, it is possible to additionally cope with a stream in which an encoded data video format varies dynamically.

As many apparently widely different embodiments of this invention may be made without departing from the spirit and scope thereof, it is to be understood that the invention is not limited to the specific embodiments thereof except as defined in the appended claims.

What is claimed is:

1. A recording and reproducing apparatus comprising:
   a reproduction unit detecting device for receiving a compressed and encoded signal to detect a head of a reproduction unit of the received signal;
   a recording and reproducing device for recording said compressed and encoded signal on a predetermined record medium and further for reproducing the recorded signal;
   a management information recording device for recording time information corresponding to said head of said reproduction unit and information on a signal quantity in said reproduction unit; and
   a reproduction control device for making a decision on a reproduction position of said predetermined record medium in reproduction on the basis of said time information and said signal quantity information recorded by said management information recording device.

2. A recording and reproducing apparatus according to claim 1, wherein said management information recording device is made to record said time information and said signal quantity information in an area different from an area of said compressed and encoded signal.

3. A recording and reproducing apparatus according to claim 1, wherein said management information recording device is made to record said time information and signal quantity information on said compressed and encoded signal in a multiplexed state.

4. A recording and reproducing apparatus according to claim 1, wherein said compressed and encoded signal is a signal conforming to the MPEG system, and said reproduction unit forms a GOP.

5. A recording and reproducing apparatus according to claim 1, further comprising a decoding device for decoding one of said compressed and encoded signal and a signal reproduced by said recording and reproducing device.

6. A recording and reproducing apparatus according to claim 1, wherein said compressed and encoded signal is a signal conforming to the MPEG system, and said recording and reproducing device is made to record a transport stream, while said management information recording device records, in addition to said time information and said signal quantity information, at least one of a PID of said transport stream to be recorded and a service ID.

7. A recording and reproducing apparatus according to claim 1, wherein said management information recording device is made to record said time information and said signal quantity information at every program to be recorded by said recording and reproducing device.

8. A recording and reproducing apparatus according to claim 1, wherein said compressed and encoded signal is a signal conforming to the MPEG system, and said time information corresponding to said head of said reproduction unit is at least one of a PCR value included in said compressed signal, a STC value based on said PCR value, time measurement information for use in signal processing, and a PTS and a DTS included in said compressed signal.

9. A recording and reproducing apparatus according to claim 1, wherein signal quantity information on said reproduction unit is one of the number of packets, the number of bytes and the number of bits in said reproduction unit and an encoded bit rate.

10. A recording and reproducing apparatus according to claim 1, wherein said recording and reproducing device is made to start the recording from said head of said reproduction unit.

11. A recording and reproducing apparatus according to claim 1, wherein said reproduction control device calculates a time information value of a shifting destination on the basis of a shift time in time shift reproduction to obtain time information corresponding to data being reproduced, and changes a reproduction position on said predetermined record medium on the basis of a difference between the obtained time information and said time information value of said shifting destination.

12. A recording and reproducing apparatus according to claim 1, further comprising a shift time displaying device for displaying a shift time in time shift reproduction by calculating a difference between time information obtained in recording on a program recorded by the recording and reproducing device and time information obtained at the display.

13. A recording and reproducing apparatus according to claim 1, further comprising a shiftable time displaying device for, in time shift reproduction, obtaining a shiftable time to the future by calculating a difference between time information obtained in recording on a program recorded by the recording and reproducing device and time information obtained at the display and obtaining a shiftable time to the past by calculating a difference between the oldest time information of data of said program and said time information obtained at the display to display said shiftable time to the future and said shiftable time to the past.

14. A recording and reproducing apparatus according to claim 1, wherein said reproduction control device calculates a shifting destination of data to be read out from said record medium on the basis of information on a multiplier by which its reproduction-speed increases accordingly, said time information and said signal quantity information in special reproduction.

15. A recording and reproducing apparatus according to claim 5, wherein said reproduction control device gives a signal reproduced by said recording and reproducing device to said decoding device when a free space exists in a buffer of said decoding device.

16. A recording and reproducing apparatus according to claim 1, wherein said compressed and encoded signal is a signal conforming to the MPEG system, and said management information recording device records a PCR value immediately before said head of said reproduction unit as said time information and records a signal quantity between the PCR values immediately before said heads of said two reproduction units as said signal quantity information.

* * * * *